(12) United States Patent
Peng et al.

(10) Patent No.: US 10,616,289 B2
(45) Date of Patent: Apr. 7, 2020

(54) SYSTEM AND METHOD FOR MANAGING ONLINE GROUP CHAT

(71) Applicant: LinkTime Corp., San Jose, CA (US)

(72) Inventors: Feng Peng, San Jose, CA (US);
Xiaojun Li, Sunnyvale, CA (US);
Wenxin Song, San Jose, CA (US)

(73) Assignee: LINKTIME CORP., San Jose, CA (US)

( * ) Notice: Subject to any disclaimer, the term of this patent is extended or adjusted under 35 U.S.C. 154(b) by 645 days.

(21) Appl. No.: 15/045,000

(22) Filed: Feb. 16, 2016

(65) Prior Publication Data

US 2017/0237785 A1 Aug. 17, 2017

(51) Int. Cl.
*H04L 29/06* (2006.01)
*H04L 29/08* (2006.01)
*H04L 12/58* (2006.01)

(52) U.S. Cl.
CPC .......... *H04L 65/403* (2013.01); *H04L 51/04* (2013.01); *H04L 51/20* (2013.01); *H04L 67/26* (2013.01)

(58) Field of Classification Search
CPC ....... H04L 65/403; H04L 51/04; H04L 51/20; H04L 67/26
USPC ......................................................... 709/206
See application file for complete search history.

(56) References Cited

U.S. PATENT DOCUMENTS

| 9,275,372 | B2* | 3/2016 | O'Sullivan | G06Q 10/107 |
| 2006/0075029 | A1* | 4/2006 | Kelso | H04L 51/04 709/206 |
| 2008/0103854 | A1* | 5/2008 | Adam | G06F 21/6218 705/344 |
| 2013/0132489 | A1* | 5/2013 | Huang | H04L 67/18 709/206 |
| 2014/0229866 | A1* | 8/2014 | Gottlieb | H04L 65/403 715/758 |

FOREIGN PATENT DOCUMENTS

CN 102523179 A 6/2012

* cited by examiner

*Primary Examiner* — Mohamed A. Wasel
*Assistant Examiner* — Patrick F Ngankam
(74) *Attorney, Agent, or Firm* — Orrick, Herrington & Sutcliffe LLP

(57) ABSTRACT

A system for managing online group chat and methods for making and using same. A server computer can create a topic in a chat group and receive a request from a user device for a member of the chat group to join the topic. The request can be in response to activation of a user interface for the topic on the user device. The member can be permitted in real time to join a topic subgroup associated with the topic upon determination that a membership of the topic subgroup is less than a maximum participant number. The maximum participant number can be at least partially based on a messaging service capacity of the server. A publish-subscribe messaging service can be offered for the topic subgroup. Advantageously, the topic subgroup can be dynamically updated based on operation on the user device to reduce server workload and improve user experience.

15 Claims, 24 Drawing Sheets

SYSTEM AND METHOD FOR MANAGING ONLINE GROUP CHAT

FIELD

The disclosed embodiments relate generally to communication technology and more particularly, but not exclusively, to systems and methods for managing online group chat.

BACKGROUND

Online group chat provides a real time interactive communication mechanism for members within a chat group. When a member of the chat group sends a chat message to a server over an Internet connection, the server pushes the chat message to all other members in real time. Each member receives all the chat messages sent by all other members in the chat group.

The number of members of a chat group is an important parameter for the system performance of online group chat tools. Existing online group chat tools usually set a maximum member number for the chat group. The maximum member number can range from 50 to 500. The maximum member number is enforced to limit workload on backend communication system such as the server and to avoid excess information for each member.

When the maximum member number is reached, the chat group cannot accept an individual who wants to join the chat group. Thus, the individual is not able to join the chat group and thus is not able to participate in any activity in the chat group (including viewing the chat messages). On the other hand, some members in the chat group do not actually actively participate in chatting. Thus, capacity of the chat group cannot be fully utilized, chat messages in the chat group cannot be viewed by all interested individuals, and user experience can be adversely affected.

In view of the foregoing, there is a need for systems and methods for managing online group chat that overcome disadvantages of existing systems and methods.

Figure 1:
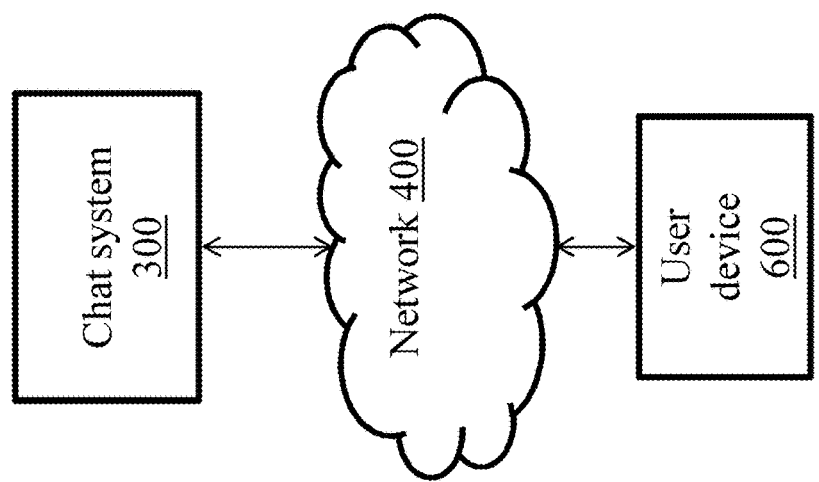
FIG. 1 is an exemplary diagram illustrating an embodiment of a topology of online group chat, wherein the topology includes a chat system and a user device.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available methods are incapable of managing online group chat for optimizing information utilization and user experience, a system and method that improve information utilization and user experience can prove desirable and provide a basis for a wide range of communication applications, such as chat systems for online shopping product review, event organization, and/or course discussion for education institutions. This result can be achieved, according to one embodiment disclosed herein, by a topology 100 as illustrated in FIG. 1.

Turning to FIG. 1, the topology 100 is shown as including a user device 600. The user device 600 can include any computer system and/or electronic device for providing one or more user interfaces (shown in FIGS. 15-17 and 19-21). An exemplary user device 600 can include any conventional type of personal computer (PC) and/or mobile computer device, such as a tablet computer and/or a smart phone.

The topology 100 of FIG. 1 also is shown as including a chat system 300. The chat system 300 can include one or more computer systems for implementing functions including, but not limited to, providing services by which the user device 600 can join online group chat. The chat system 300 can be operated by a system operator, including a business entity, such as a corporation, and/or an individual. The user device 600 can notify the chat system 300 of selected operations being performed on the user device 600.

The chat system 300 and/or the user device 600 can communicate via a communication network 400. The communication network 400 can support wired and/or wireless communication between the chat system 300 and the user device 600. Exemplary communication network 400 can include, but are not limited to, a local area network (LAN), a wide area network (WAN), a business intranet, the Internet, a wireless network, a cellular network, and/or other networks that use radio, Wireless Fidelity (Wi-Fi), satellite, and/or broadcast communications.

The communication network 400 can support communications via one or more selected communications standards, protocols and/or technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (for example, IEEE 802.11a, IEEE 802.11b, IEEE 802.11g and/or IEEE 802.11n), voice over Internet Protocol (VoIP), Wi-MAX, a protocol for email (for example, Internet message access protocol (IMAP) and/or post office protocol (POP)), instant messaging (for example, extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)).

Although FIG. 1 shows the topology 100 as including one chat system 300, one user device 600, and one communication network 400 for purposes of illustration only, the topology 100 can include any suitable number of chat systems 300, user devices 600 and communication networks 400. The chat systems 300 can comprise uniform and/or different types of chat systems 300; whereas the user devices 600 can comprise uniform and/or different types of user devices 600. Each user device 600 can communicate with the chat system 300 or another user device 600 via uniform and/or different communication networks 400.

Figure 2:
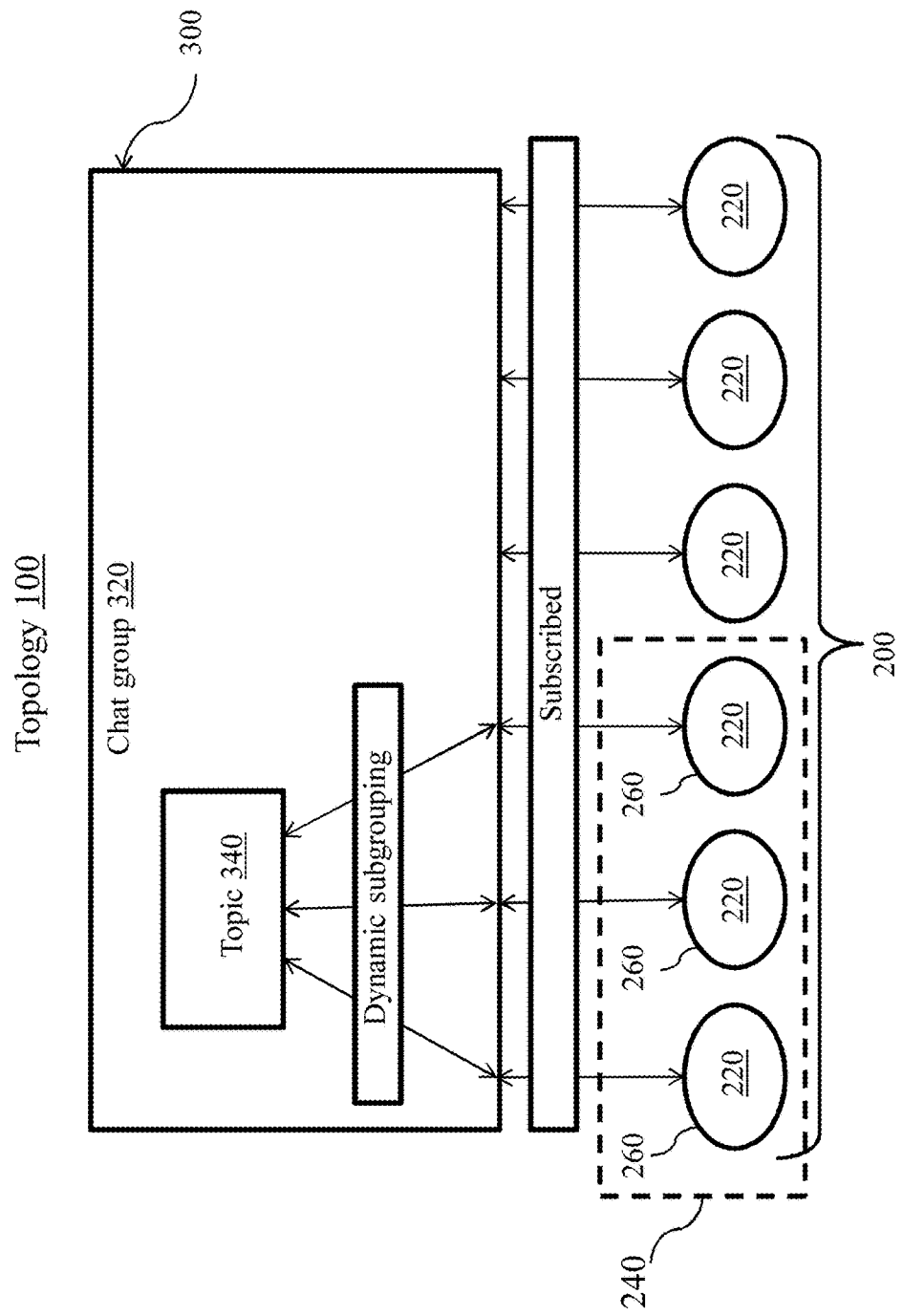
FIG. 2 is an exemplary diagram illustrating an alternative embodiment of the topology of FIG. 1, wherein the chat system manages a chat group including at least one topic subgroup.

Turning now to FIG. 2, the topology 100 is shown to include a chat group 320. The chat group 320 can be operated by the chat system 300. The chat group 320 can include an environment of online group chat.

The topology 100 is shown as including a plurality of users 200. Each of the users 200 can include a business entity (such as a corporation) and/or one or more individuals that can obtain communication service, such as online group chat, via the user device 600 (shown in FIG. 1).

A user 200 can subscribe to the chat group 320. For example, the user 200 can subscribe to the chat group 320 via completing a registration process required by the chat system 300 for the chat group 320. By subscribing to the chat group 320, the user 200 can become a member 220 of the chat group 320.

FIG. 2 shows that a topic 340 has been created in the chat group 320. The topic 340 can include any conversation theme. One or more members 220 can be interested in the topic 340 and intend to follow discussion on the topic and/or send reply messages related to the topic 340 for sharing with other members 220. The topic 340 can be associated with a topic subgroup 240. In other words, the topic subgroup 240 can be categorized under the topic 340.

The topic subgroup 240 can include one or more members 220 that are permitted to join the topic 340. Stated somewhat differently, when a selected member 220 joins the topic 340, the selected member 220 automatically joins the topic subgroup 240 associated with the topic 340. By joining the topic 340, the member 220 becomes a participant 260 of the topic 340 and/or the topic subgroup 240.

Although FIG. 2 shows one topic 340 as being created for the chat group 320, any number of topics 340 can be created for the chat group 320. Each topic 340 can be associated with a respective topic subgroup 240. Each topic subgroup 240 can include uniform and/or different members 220 of the chat group 320. In other words, a member 220 can be a participant of one or more topic subgroups 240, and the membership in a first topic subgroup 240 can be the same and/or different from the membership in a second topic subgroup 240.

Figure 3:
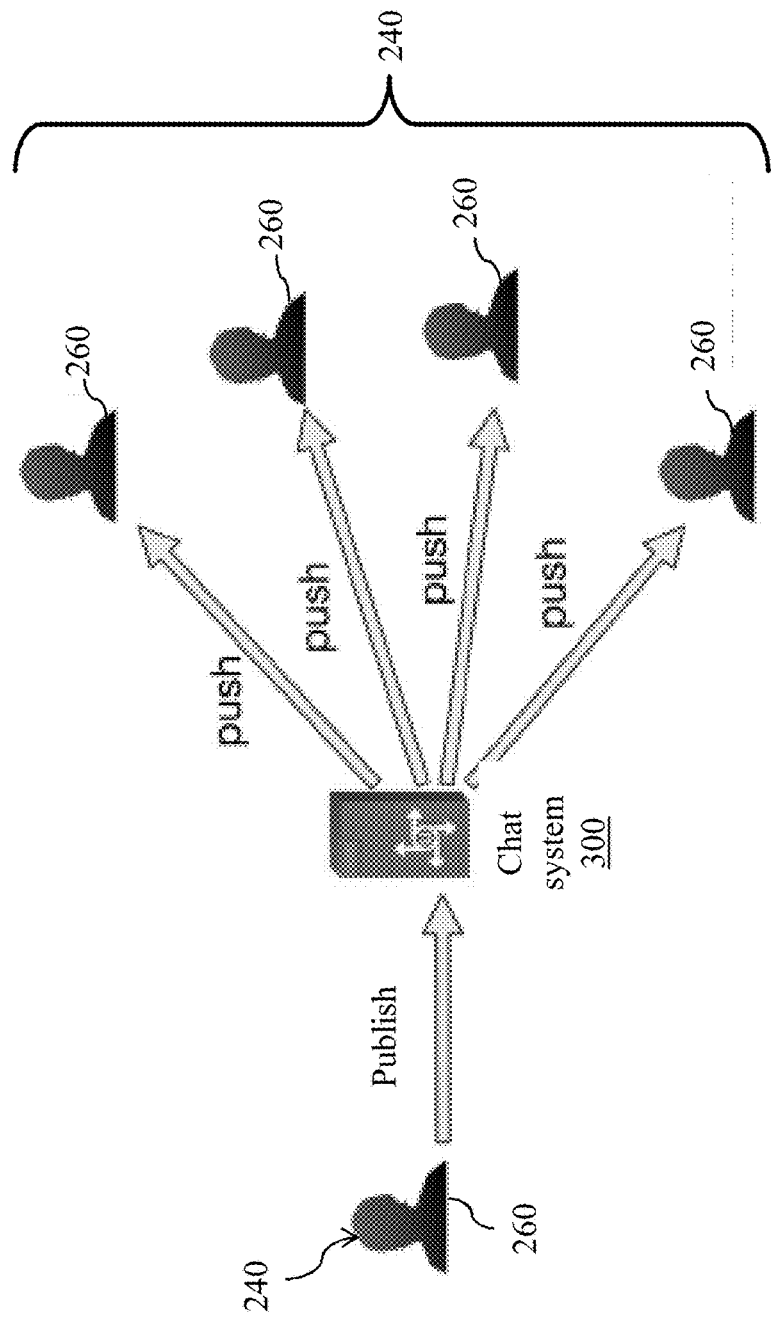
FIG. 3 is an exemplary diagram illustrating another alternative embodiment of the topology of FIG. 2, wherein the chat system provides a publish-subscribe messaging service.

The chat system 300 advantageously can provide a publish-subscribe (pub-sub) messaging service within the topic subgroup 240. Turning to FIG. 3, the topology 100 illustrates an exemplary (pub-sub) messaging service. By sending a reply message to the topic subgroup 240, a participant 260 publishes the reply message to the topic subgroup 240. The chat system 300 can push the reply message to all other participants 260 of topic subgroup 240. These other participants 260 can include all of the participants 260 of topic subgroup 240 except the participant 260 who sent the reply message.

By using the pub-sub messaging service, the participant 260 of the topic subgroup 240 does not need to pull a reply message of the topic subgroup 240 from the chat system 300. Instead, the chat system 300 advantageously can push the message to the participant 260 of the topic subgroup 240 in real time.

Figure 4:
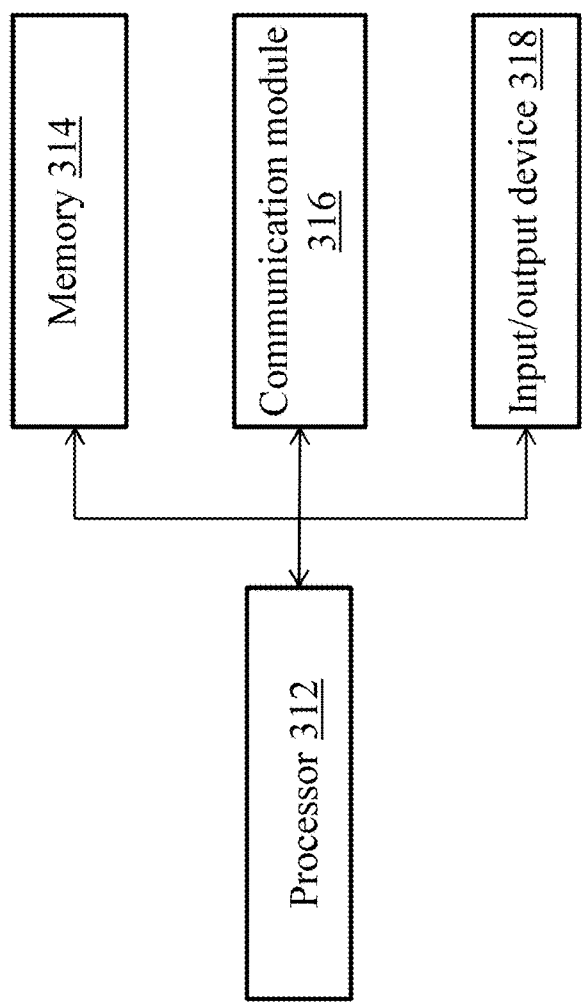
FIG. 4 is an exemplary diagram illustrating another alternative embodiment of the chat system of FIG. 1, wherein the chat system includes a processor and memory.

Turning to FIG. 4, an exemplary diagram of the chat system 300 is shown. An exemplary chat system 300 can include one or more servers (or server computers, chat system servers). FIG. 4 shows the chat system 300 as including a processor 312. The processor 312 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like.

The chat system 300 can include one or more additional hardware components, as desired. Exemplary additional hardware components include, but are not limited to, a memory 314 (for example, a random access memory (RAM), static RAM, dynamic RAM, read-only memory (ROM), programmable ROM, erasable programmable ROM, electrically erasable programmable ROM, flash memory, secure digital (SD) card, etc.) Instructions for execution by the processor 312 can be stored on the memory 314.

Additionally and/or alternatively, the chat system 300 can include a communication module 316. The communication module 316 can include any conventional hardware and software that operate to exchange data and/or instruction between the chat system 300 and the communication network 400 (shown in FIG. 1) in any wired and/or wireless communication manner. For example, the communication module 316 can include radio frequency (RF) circuitry (not shown) for receiving and/or transmitting RF signals.

The chat system 300 can include an input/output device 318. An exemplary input/output device 318 can include button, keyboard, keypad, trackball, display, touch screen, and/or monitor, as desired. An operator can input instructions to, and/or obtain information from, the chat system 300 by using the input/output device 318. The processor 312, the memory 314, the communication module 316, and/or the input/output device 318 can be configured to communicate, for example, using hardware connectors and buses and/or in a wireless manner.

Although FIG. 4 shows the chat system 300 as including one processor 312, one memory 314, one communication module 316, and one input/output device 318, the chat system 300 can include any number of uniform and/or different processors 312, memories 314, communication modules 316 and/or input/output devices 318.

Figure 5:
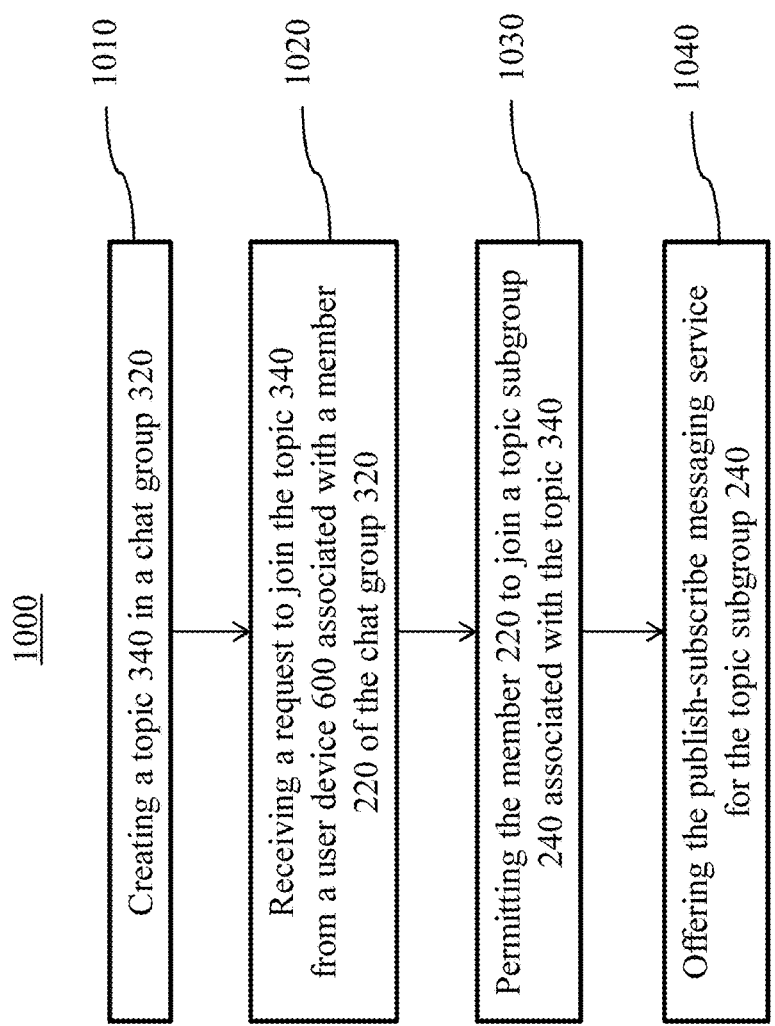
FIG. 5 is an exemplary flow chart illustrating an embodiment of a method for managing online group chat via the chat system of FIG. 2.

Turning to FIG. 5, a method 1000 for managing online group chat is shown. The method 1000 can be implemented by the chat system 300 (shown in FIG. 2). The topic 340 is created, at 1010, in the chat group 320. The topic 340 can include a conversation theme that can be of potential interest to one or more members 220 of the chat group 320.

For example, the chat system 300 can create the topic 340 based on a title message sent by one of the members 220 (shown in FIG. 2) of the chat group 320 via a user device 600 (shown in FIG. 1). The title message can include any form of information that can be a theme for a chat. Exemplary title message can include text, image, and/or web page. For example, the chat group 320 can have a theme of local sporting events. One of the members 220 can send a title message to the chat system 300 to notify the chat group 320 of an upcoming football match. The chat system 300 can thus create the topic 340 associated with the title message.

Additionally and/or alternatively, the chat system 300 can create the topic 340 based on one or more selected classification criteria. Exemplary classification criteria can be inputted by an operator and/or stored on the chat system 300. The classification criteria can be determined based on a theme and/or purpose of the chat group 320. Exemplary classification criteria can include geographic region, business, organization, and/or event.

In one example, the chat group 320 can have a purpose of presenting restaurant reviews. Each topic 340 can be based on reviews for restaurant in a selected geographic region. Thus, the classification criteria can include geographic region and/or type of restaurant.

In another example, the chat group 320 can have a purpose of organizing a conference of a professional society. The members 220 of the chat group 320 can include conference attendees. A topic 340 can be based on a selected symposium of the conference so that participants 260 (shown in FIG. 2) of the topic 340 can chat about events of the selected symposium associated with the topic 340.

In another example, the chat group 320 can have a theme of courses of an academic year in an educational institution. The members 220 of the chat group 320 can include course attendees of the academic year. A topic 340 can be based on a selected course so that participants 260 of the topic 340 can chat about lectures of the selected course.

In yet another example, the chat group 320 can have a purpose of online shopping service via a website. The members 220 of the chat group 320 can include customers that shop via the website. A topic 340 can be based on a selected product so participants 260 of the topic 340 can chat about the selected product.

As shown in FIG. 5, a request to join the topic 340 is received, at 1020, from a user device 600 associated with a member 220 of the chat group 320. The user device 600 can be associated with the member 220 by being operated by the member 220 for interacting with the chat system 300 (shown in FIG. 1). For example, the member 220 can be logged onto an account with the chat system 300 and/or the chat group 320 via the user device 600.

An exemplary request can be triggered by an operation on the user device 600. That is, upon execution of the operation, the user device 600 can generate the request and/or send the request to the chat system 300 in real time.

The operation can include any action of operating the user device 600 to join the topic 340 and/or view a presentation of the topic 340. An exemplary operation can include activating a user interface of the topic 340 (or associated with the topic, or under the topic 340). Activating the user interface can include opening and/or entering the user interface. Regardless of whether the member 200 is permitted to join the topic 340 or not, the operation can result in activation of the user interface associated with the topic 340. An exemplary operation can include selecting the topic 340 via a group interface 610B (shown FIG. 15).

The user interface associated with the topic 340 can be used by any participant 260 of the topic 340 to view and/or reply to discussion of the topic 340. The user interface can display contents including one or more reply messages and/or the title message of the topic 340. An exemplary user interface can include a topic interface 610C (shown in FIG. 16).

As shown in FIG. 5, the member 220 is permitted, at 1030, to join a topic subgroup 240 associated with the topic 340. A membership of the topic subgroup 240 can include a total number of participants 260 in the topic subgroup 240. The membership of the topic subgroup 240 can be limited to a maximum participant number. Thus, the member 220 can be added to, and/or listed in, the topic subgroup 240 when the membership of the topic subgroup 240 is less than the maximum participant number.

The topic subgroup 240 can be created by having at least one member 220 join the topic 340. The member 220 can be added to the topic subgroup 240 in real time. Stated somewhat differently, upon receiving the request at 1020, the chat system 300 can add the member 220 to the topic subgroup 240 within a small time interval, for example, in less than one second. The time interval can be determined by computation speed of the chat system 300.

For example, the chat system 300 can generate an online group chat channel dedicated to the topic 340. The online group chat channel can include persistent network connection established between the chat system 300 and the user device 600 respectively associated with each participant 260 of the topic 340. Once being added to the topic subgroup 240, the participant 260 can use the online group chat channel via the user device 600 to discuss the topic 340.

As shown in FIG. 5, the pub-sub messaging service is offered, at 1040, for the topic subgroup 340. When the topic subgroup 240 has the dedicated online group chat channel, the pub-sub messaging service can be implemented on a continuous basis.

Optionally, the chat group 320 can have a maximum member number that can be predetermined by the chat system 300. For example, the maximum member number can be any number that has an order of magnitude of $10^a$, where a can be any number such as 3, 4, 5, 6, . . . and/or the like. The maximum member number can be determined based on any predetermined factors. Exemplary factor can include size limit of member registration database that the chat system 300 manages for the chat group 320. In one example, the number of the members 220 of the chat group 320 can be unlimited.

The maximum participant number of the topic subgroup 240 can be based on factors related to capability of the chat system 300, the user device 600, and/or the network 400 (shown in FIG. 1). An exemplary factor can include a messaging service capacity of the chat system 300, such as maximum number of reply messages that the chat system 300 can push for the topic subgroup 240 within a unit time duration. Additionally and/or alternatively, an exemplary factor can include a capacity of the user device 600 and/or a messaging frequency within the topic subgroup 240. For example, when the membership of the topic subgroup 240 is equal to the maximum participant number and each participant 260 in the topic subgroup 240 is chatting at a highest frequency, the user device 600 can be capable of receiving all the incoming reply messages and/or the participant 260 associated with the user device 600 can be capable of consuming all the reply messages.

In one embodiment, the topic subgroup 240 can have a maximum participant number that can be predetermined by the chat system 300. The maximum participant number can be less than and/or equal to the maximum member number of the chat group 320.

In another embodiment, the maximum participant number can be predetermined by the chat system 300 dynamically. For example, when the chat system 300 experiences a heavy workload (for example, a very high rate of network data transfer that approaches capacity of the chat system 300), the chat system 300 can set the maximum participant number to a small number. When the chat system 300 detects a reduction in workload, the chat system 300 can increase the maximum participant number. When the chat system 300 manages a plurality of topic subgroups 320, the topic subgroups 320 can have uniform and/or different maximum participant numbers.

By appropriately selecting the maximum participant number for the topic subgroup 340, workload of offering the pub-sub messaging service can advantageously be maintained at a level manageable to the chat system 300.

If the chat system 300 offers the pub-sub messaging service to the chat group 320 that has N members 220, increase of N can result in significant increase of the workload of the chat system 300. For example, if each of the N members in the chat group 320 sends a reply message, the total number of the reply messages that the chat system 300 needs to push to the members 220 can be $N*(N-1)$, which can increase quadratically with N. Each member 220 can receive hundreds or even thousands of reply messages in a short amount of time and can become too overwhelmed to consume all the reply messages. Communication efficiency of group chat is thus reduced.

Certain group chat services can manually separate a large chat group 320 into subgroups to meet a predetermined user limit. Such manual separation can require a significant amount of replicated work and complexity in group communications. For example, for an important notice (or topic or question) to be viewed by all potentially interested members 220, the notices needs to be published in all subgroups manually and similar questions regarding the notice in different subgroups needs to be answered repetitively in each subgroup.

The disclosed method 1000 can overcome the above technical challenges of operating a very large chat group 320 by dynamically subgrouping the members 220 based on operations of the members 220 on the user device 600. The operations can reflect real-time interest in participation of the members 220. The member 220 that is subgrouped can be adding to the online group chat channel. Such a process requires the chat system 300 having specialized hardware and/or hardware instructed by specialized software, and is not achievable via mere human activity.

In accordance with the disclosed method 1000, even if the chat group 320 has a very large number of members 220, the pub-sub messaging service can be offered within the topic subgroup 240 with a limited membership. If the topic subgroup 240 has M participants 260 and each of the M participants 260 sends a reply message, for example, the total number of the reply messages that the chat system 300 needs to push for the topic subgroup 240 can be $M*(M-1)$. If the chat group 320 has N/M topic subgroups 240, the total number of the reply messages that the chat system 300 needs to push the chat group 320 groups can be $(N/M)*M*(M-1)=N*(M-1)$. Since the number M can be a few orders of magnitude smaller than number N, the workload on the chat system 300 advantageously can be much smaller than $N*(N-1)$ and can grow linearly, instead of quadratically, with the number N of members 220 in the chat group 320.

Further, because the number of participants 260 of the topic subgroup 240 can be limited, the reply messages for each topic 340 can be limited to a smaller amount so that the discussion of each topic 340 can be more easily followed.

Figure 6:
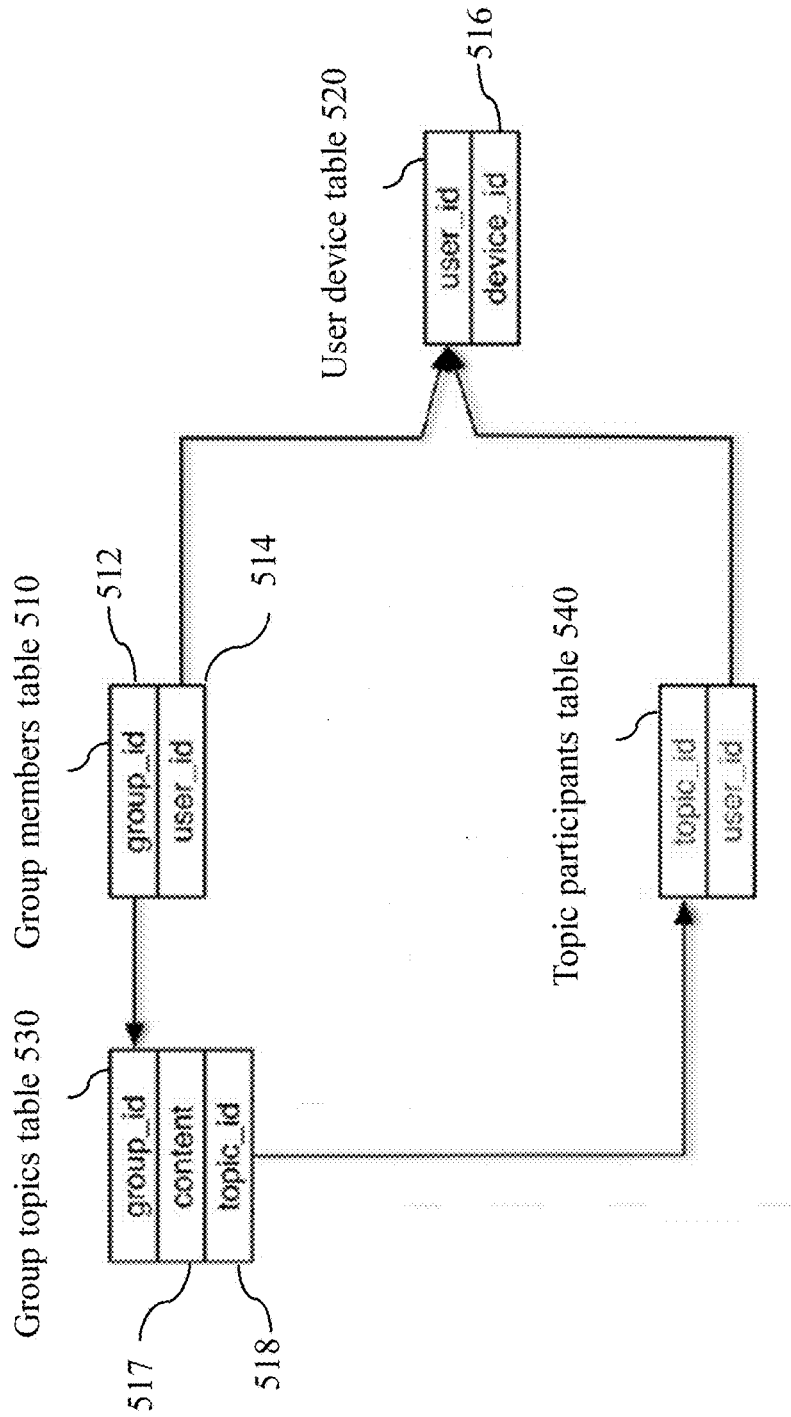
FIG. 6 is an exemplary diagram illustrating an embodiment of a data structure for managing online group chat using the chat system of FIG. 2.

Turning now to FIG. 6, an exemplary data structure 500 for the chat group 320 is shown. The data structure 500 can be generated, stored, and/or updated by the chat system 300 (shown in FIG. 2). The data structure 500 can be in any suitable database form. Exemplary database forms can include any conventional database forms, such as a relational database (such as data spreadsheet or table) and/or a graph database.

The data structure 500 can include a group members table 510 associated with the chat group 320 (shown in FIG. 2). The group members table 510 can include a group_id (or group identification) 512 that the chat system 300 can use for uniquely identifying the chat group 320. The group members table 510 can include at least one user_id (or user identification) 514 associated with a member 220 (shown in FIG. 2) of the chat group 320. When the chat system 300 manages a plurality of groups 320, the chat system 300 can generate a group members table 510 for each of the groups 320.

Additionally and/or alternatively, the data structure 500 can include a user device table 520. The user device table 520 can include at least one user_id 514 and a device_id 516 associated with each user_id 514. The chat system 300 can use the user_id 514 to identify the user 200 (shown in FIG. 2) of the chat system 300 and/or of the chat group 320. Each of the user_id 514 can be associated uniquely with a user 200. The chat system 300 can use the device_id 516 to uniquely identify the user device 600 (shown in FIG. 1).

Although FIG. 6 shows the user device table 520 as including one user_id 514 and one device_id 516, the user device table 520 as including one user_id 514 and one device_id 516. One user_id 514 can be associated with one or more device_ids 516. One device_id 516 can be associated with one or more user_ids 514.

Additionally and/or alternatively, the data structure 500 can include a group topics table 530 associated with the chat group 320. The topic data 530 can include the group_id 512 of the chat group 320. The group topics table 530 can include at least one topic_id 518 for uniquely identifying a topic 340 (shown in FIG. 2). The group topics table 530 can include content 517 of each topic 340. Exemplary content 517 can include the title message and/or the selected classification criteria for creating the topic 340. Each topic 340 can be created by adding the topic_id 518 of the topic 340 into the group topics table 530.

When the chat system 300 manages a plurality of chat groups 320, the chat system 300 can generate a custom group topics table 530 for each of the chat groups 320.

The chat system 300 can manage online group chat by implementing operations each based on one or more server calls. An exemplary server call can be based on one or more parameters in the data structure 500. Table 1 shows exemplary pseudo code of a server call 'createTopic' for creating a new topic 340 based on parameters including the group_id 512, the topic_id 518, the user_id 514 and/or the content 517. The item in Table 1 can refer to the new topic 340, content 517 of the new topic 340, and/or the chat group 320 in which the new topic 340 is created.

TABLE 1 createTopic(group_id 512, topic_id 518, user_id 514, content 517)
    server inserts an item to the group topics table 530;
    find all the users 200 belonging to the chat group
    320 using the group members table 510;
    send notifications to user devices 600 using the
    user device table 520;

Additionally and/or alternatively, the data structure 500 can include a topic participants table 540 associated with the topic 340. The topic participants table 540 can include the topic_id 518 and one or more user_ids 514 each associated with a participant 260 of the topic 340. When the chat group 320 includes a plurality of topics 240, the chat system 300 can generate the topic participants table 540 for each topic 340.

Thus, via the data structure 500, the chat system 300 can identify, index and/or interrelate the user 200, the chat group 320 and/or the topic 340 in an organized and manner. In various applications, the chat system 300 can manage a large number of users 200, chat groups 320 and/or topics 340. For example, the chat system 300 can manage thousands of groups 320. Each chat group 320 can have tens of thousands of topics 340. Millions of users 200 can subscribe to each chat group 320.

When a user 200 requests to join a selected topic 340, the chat system 300 can have computation capability to immediately identify the user_id 514 associated with the user 200, locate a group_id 512 the user 200 subscribes to, and the topic_id 518 of the selected topic 340. In real time, the chat system 300 can permit the user 200 to join the topic 340 and can establish network connections required for adding the user 200 to the online group chat channel. Thus, time interval from receiving the request of the user 200 to starting the pub-sub messaging service for the user 200 can be a few seconds, or a fraction of a second.

Therefore, the chat system 300 can dynamically subgroup the users 200 in an automated and real-time manner to control server workload and/or reduce bandwidth requirement for the online group chat channel. Such dynamic subgrouping can be implemented on a large amount of users 200 within a short time, which is impossible to achieve with mental and/or manual sorting/calculation via mere human labor.

Figure 7:
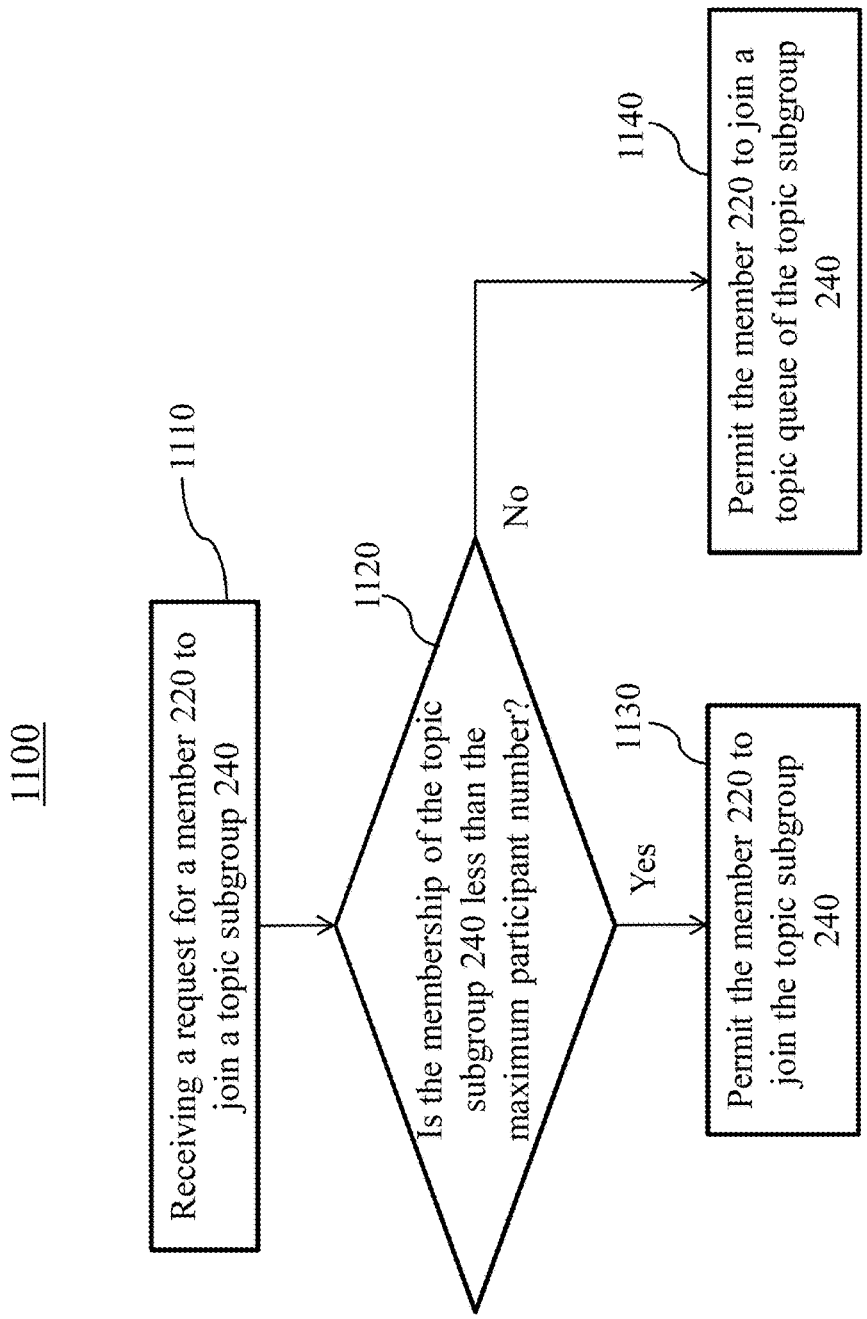
FIG. 7 is an exemplary flow chart illustrating an embodiment of a method for determining whether to permit a member of the chat group to join the topic subgroup of FIG. 2.

FIG. 7 shows an exemplary method 1100 for determining whether to permit a member 220 to join a topic subgroup 240. The chat system 300 (shown in FIG. 2) can implement the method 1100. A request for the member 220 to join the topic subgroup 240 is received, at 1110. The member 220 can send the request to the chat system 300 in any manner. In one example, the member 220 can make a selection on the user device 600 (shown in FIG. 1) to enter a user interface of the topic 340 (shown in FIG. 2) of the topic subgroup 240. Upon the selection, the user device 600 can send the request to the chat system 300.

Whether the membership of the topic subgroup 240 is less than the maximum participant number is determined, at 1120. When the membership of the topic subgroup 240 is less than the maximum participant number, the member 220 is permitted, at 1130, to join the topic subgroup 240. When the membership of the topic subgroup 240 is greater than or equal to the maximum participant number, the member 220 is not added to the topic subgroup 240.

Optionally, when the membership of the topic subgroup 240 is greater than or equal to the maximum participant number, the member 220 can be permitted, at 1140, to join a topic queue of the topic subgroup 240. The topic queue can list the member 220 that wants to, but temporarily is not permitted to join the topic subgroup 240.

The topic queue can be managed using any predetermined criteria determined by the member 220 and/or the chat system 300. In one example, the member 220 can choose to be in the topic queue until the member 220 is added to the topic subgroup 240. In another example, the member 220 can choose to be in the topic queue for a selected time duration. If the member 220 is not added to the topic subgroup 240 within the selected time duration, the member 220 can be removed from the topic queue. In yet another example, the chat system 300 can clear the topic queue at a predetermined and/or dynamically-determined frequency.

Figure 8:
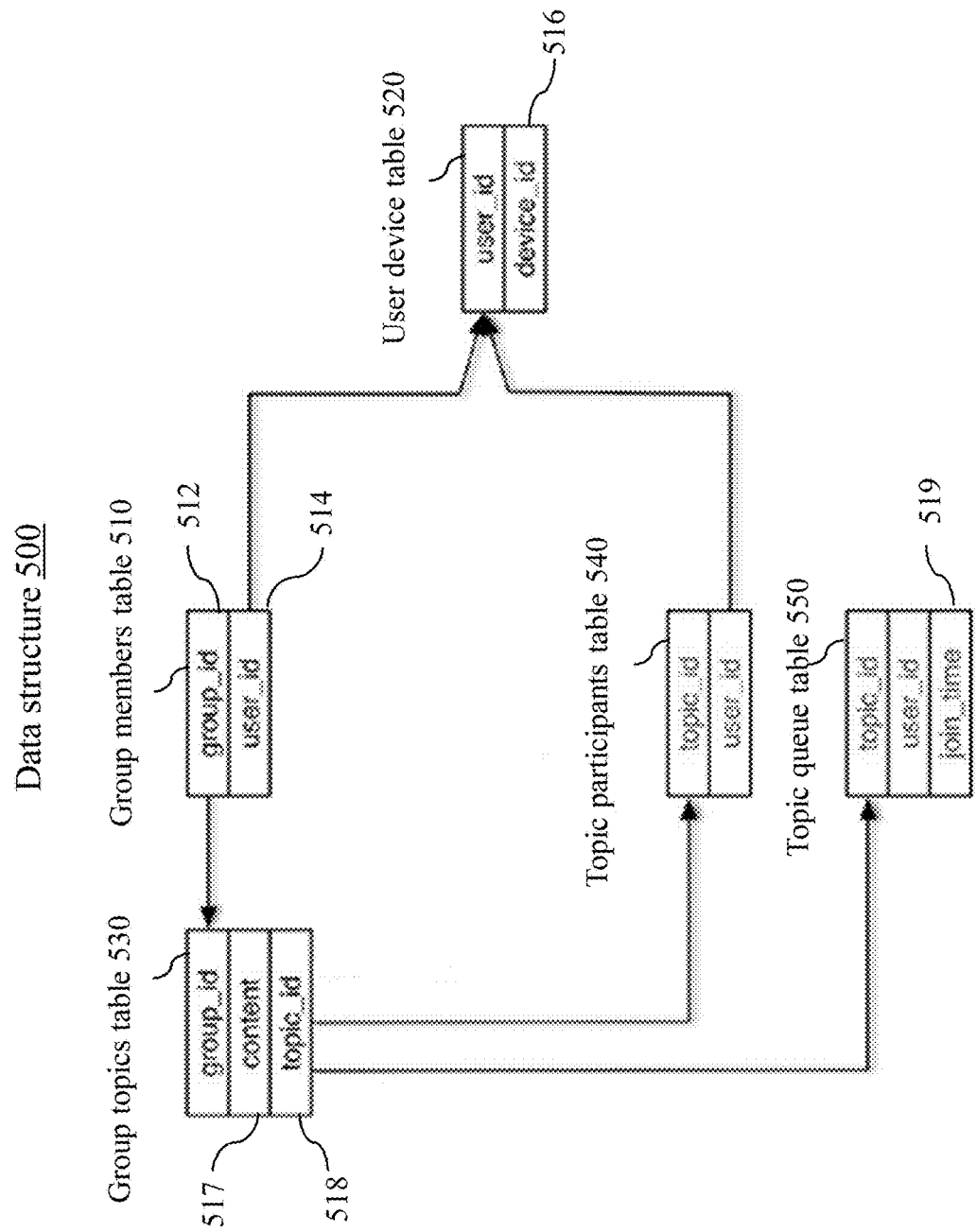
FIG. 8 is an exemplary diagram illustrating an alternative embodiment of the data structure of FIG. 6, wherein the data structure includes a topic queue table.

Turning now to FIG. 8, the data structure 500 can include a topic queue table 550 for recording the topic queue of the topic subgroup 240 (shown in FIG. 2). The topic queue table 550 can include the topic_id 518 of the topic subgroup 240 and at least one user_id 514 associated with a member 220 (shown in FIG. 2) in the topic queue.

In some embodiments, each member 220 in the topic queue can be associated with a join time. An exemplary join time can include a time stamp of the chat system 300 (shown in FIG. 2) receiving the request for the member 220 to join the topic subgroup 240.

Table 2 shows exemplary pseudo code of a server call 'joinTopic' for adding a member 220 to the topic subgroup 240 based on parameters including the group_id 512, the topic_id 518, and/or the user_id 514.

TABLE 2 joinTopic(group_id 512, topic_id 518, user_id 514)
    server queries the topic participants table 520 for the specified
    topic_id 518;
    check if the number of users 200 for that topic_id 518 has reached
    the maximum participant number;

TABLE 2-continued

```
if no
    the new user_id 514 is added to the topic participants table
    520;
else
    the new user_id 514 is added to the topic queue table 550;
```

Figure 9:
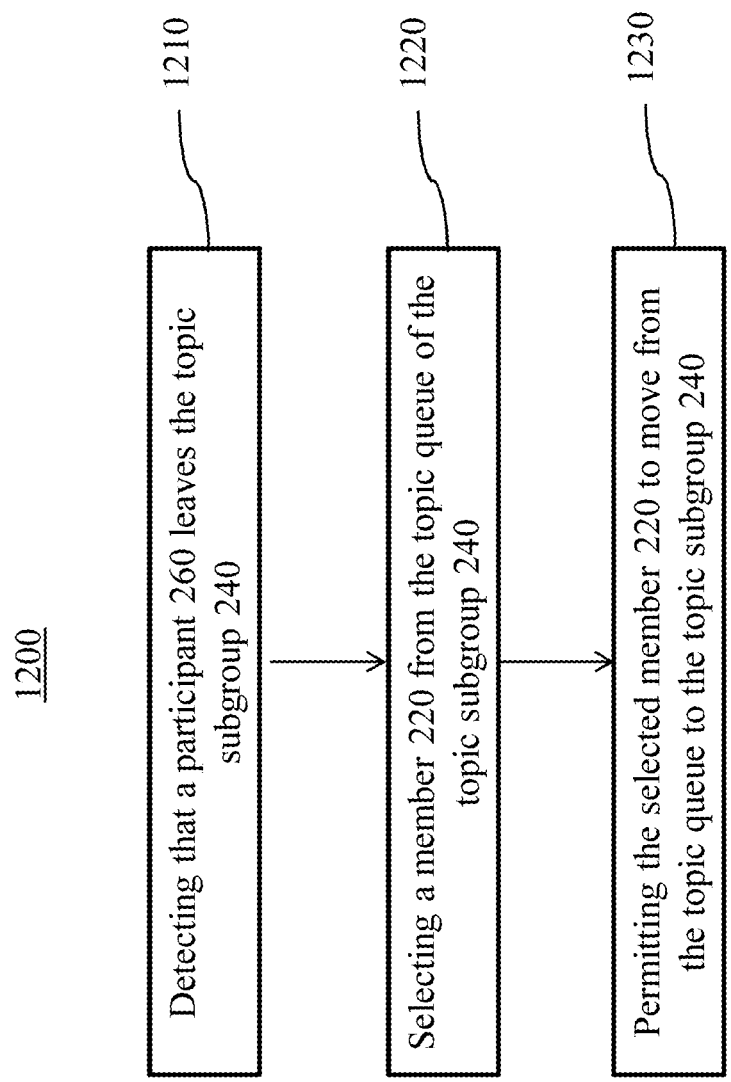
FIG. 9 is an exemplary flow chart illustrating an embodiment of a method for updating the topic subgroup of FIG. 2 upon detecting a participant leaves the topic subgroup.

Turning now to FIG. 9, an exemplary method 1200 is shown for updating the topic subgroup 240 when a participant 260 leaves the topic subgroup 240. The chat system 300 (shown in FIG. 2) can implement the method 1200. The participant 260 leaving the topic subgroup 240 is detected, at 1210.

The chat system 300 can detect that the participant 260 leaves the topic subgroup 240 in any manners. In one example, the participant 260 can browse a user interface (for example, the topic interface 610C in FIG. 16) of the topic subgroup 240 and can leave the topic subgroup 240 by navigating away from the user interface, such as switching to a chat-group-level user interface and/or a user interface of a different topic subgroup 240. The user interface can thus be deactivated.

In another example, the participant 260 can browse the user interface of the topic subgroup 240 via the user device 600 (shown in FIG. 1). A network connection between the user device 600 and the chat system 300 can be interrupted and/or terminated because the user device 600 is turned off and/or out of charge, so the user interface is deactivated. The chat system 300 can no longer receive response from the user device 600.

Stated somewhat differently, the chat system 300 can detect that the participant 260 leaves the topic subgroup 240 based on deactivation of the user interface associated with the topic 320 (shown in FIG. 2) on the user device 600. The chat system 300 can thus remove the member 220 from the topic subgroup 240. Participation of the member 220 in the topic subgroup 240 can thus be dynamically terminated upon determination that the user interface is inactive on the user device 600.

A member 220 is selected, at 1220, from the topic queue of the topic subgroup 240. The member 220 can be selected based on any predetermined criteria. For example, the member 220 can be selected based on the join time 519 (shown in FIG. 8). The member 220 associated with the earliest join time 519 can be selected. In other words, the member 220 can be selected in a first-in-first-out (FIFO) manner. Additionally and/or alternatively, each member 220 can be associated with membership due subscription payment level. For example, a member 220 paying a high subscription fee can have a high priority to be selected.

The selected member 220 is permitted to move, at 1230, from the topic queue to the topic subgroup 240. For example, the selected member 220 can be removed from the topic queue and added to the topic subgroup 240.

Table 3 shows exemplary pseudo code of a server call 'leaveTopic' when a participant 260 leaves the topic 340. The server call 'leaveTopic' can be based on parameters in the data structure 500. The parameters can include the group_id 512, the topic_id 518, and/or the user_id 514.

TABLE 3

```
leaveTopic(group_id 512, topic_id 518, user_id 514)
    the user_id 514 is removed from the topic participants table 540
    for the topic 340;
    get user_id 514 in the topic queue table 550 for the topic 340
```

TABLE 3-continued

```
    with the earliest join time 519;
    remove a resultant user_id 514 from topic queue table 550 for the
    topic 340;
    add the resultant user_id 514 to Topic Participants table 540 for
the topic 340;
```

In some embodiments, when all participants 260 of the topic subgroup 240 leave the topic subgroup 240, and no members 220 remain in the topic queue, the chat system 300 can discard the topic subgroup 240 and/or the topic 340. That is, the topic subgroup 240 and/or the topic 340 can cease to exist in the chat system 300. Optionally, the topic 340 can continue to exist and/or can be stored on the chat system 300. Once a member 220 requests to join the topic 340, the topic 340 can be re-activated.

Figure 10:
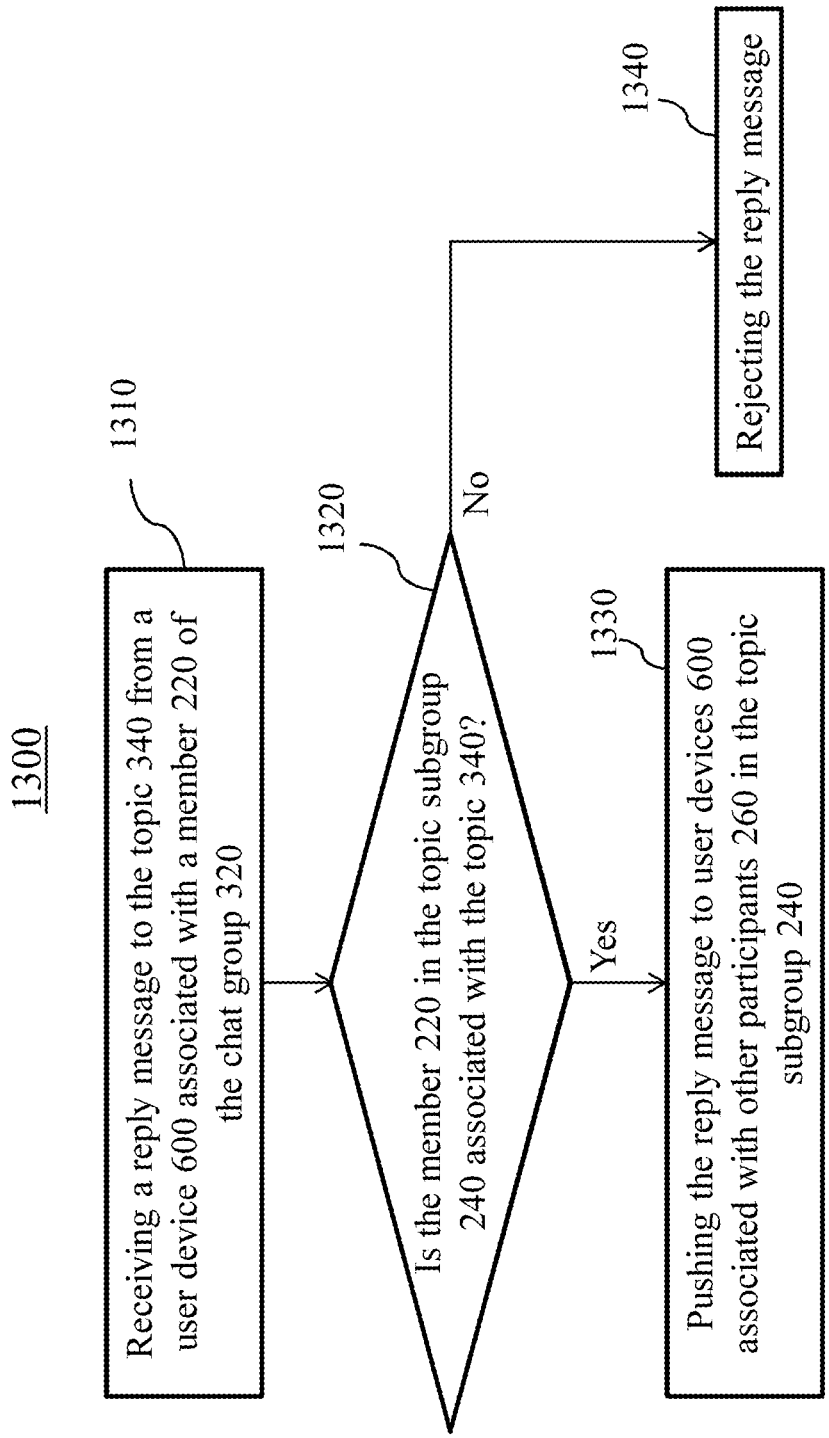
FIG. 10 is an exemplary flow chart illustrating an embodiment of a method for processing a reply message using the chat system of FIG. 2.

Turning now to FIG. 10, an exemplary method 1300 for processing a reply message is shown. The chat system 300 (shown in FIG. 2) can implement the method 1300. The reply message to the topic 340 is received, at 1310, from a user device 600 associated with a member 220 of the chat group 320. For example, the user device 600 can push the reply message to the chat system 300.

Whether the member 220 is in the topic subgroup 240 associated with the topic 340 is determined, at 1320. For example, the determining can include searching whether the user_id 514 (shown in FIG. 8) of the member 220 is in the topic participants table 540 (shown in FIG. 8) of the topic 340. When the member 220 is in the topic subgroup 240 associated with the topic 340, the reply message is pushed, at 1330, to user devices 600 associated with other participants 260 in the topic subgroup 240. When the member 220 is not in the topic subgroup 240 associated with the topic 340, the reply message is rejected, at 1340. For example, the reply message can be discarded instead of being processed and/or stored.

Although FIG. 10 shows the method 1300 as processing the reply message sent from a member 220 of the chat group 320, the method 1300 can similarly process the reply message sent from a user 200 that is not necessarily a member 220 of the chat group 320.

Figure 11:
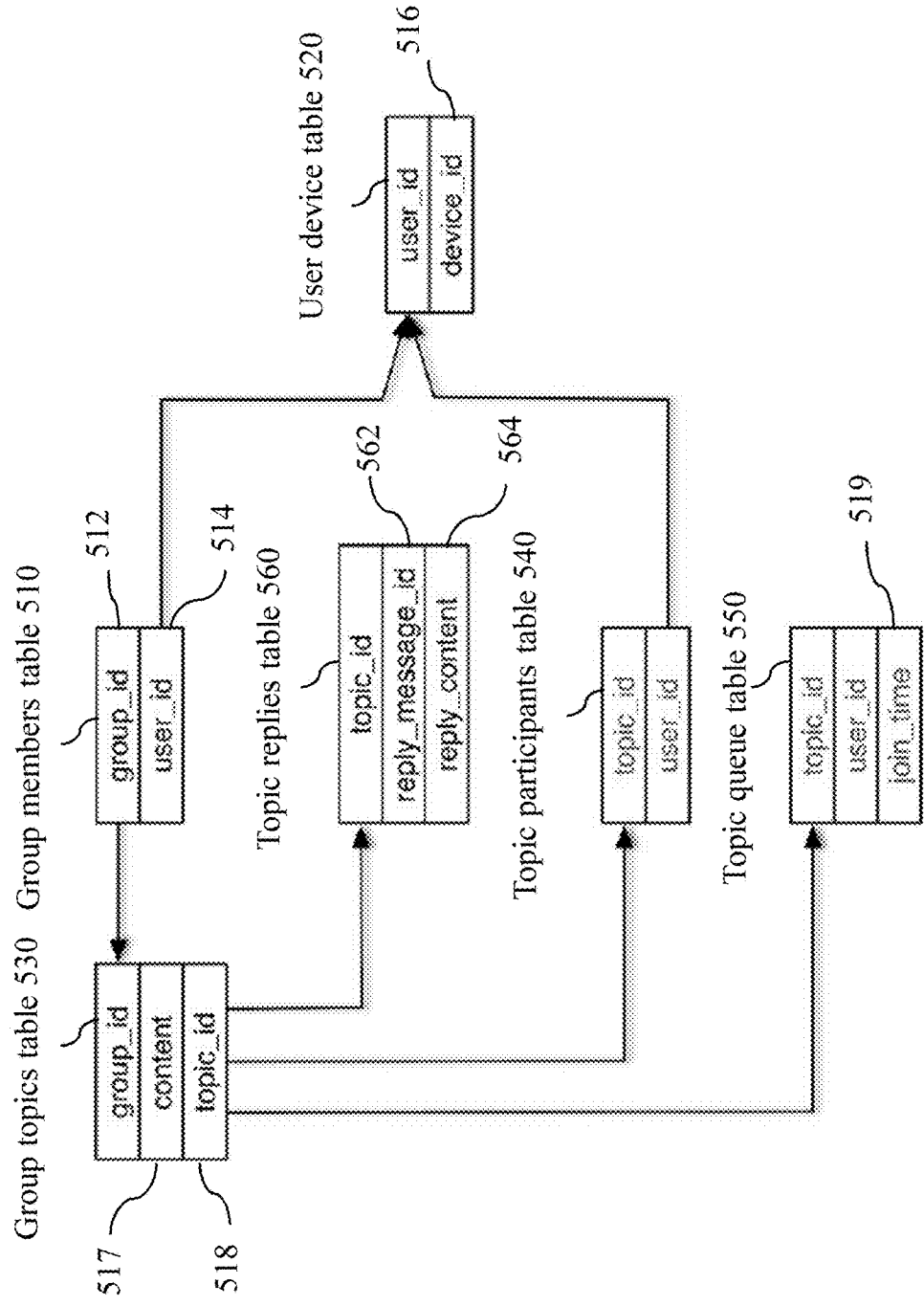
FIG. 11 is an exemplary flow chart illustrating another alternative embodiment of the data structure of FIG. 8, wherein the data structure includes a topic replies table.

Turning now to FIG. 11, the data structure 500 is shown as including a topic replies table 560 for storing and/or indexing each reply message of the topic 340 (shown in FIG. 2). The topic replies table 560 can include the topic_id 518 of the topic 340. The topic replies table 560 can include at least one reply_message_id (or reply message identification) 562 for uniquely identifying a reply message. The topic replies table 560 can include reply_content (or reply message content) 564 of the reply message.

Table 4 shows exemplary pseudo code of a server call 'replyTopic' for processing a reply message to the topic 340. The server call 'replyTopic' can be based on parameters including the group_id 512, the topic_id 518, the user_id 514, the reply_message_id 562, and/or the reply_content 564.

TABLE 4

```
replyTopic(group_id 512, topic_id 518, user_id 514,
reply_message_id 562, reply_content 564)
    server checks if the user_id 514 belongs to the topic
    participants table 540;
    if yes,
        create reply message in the topic replies table 560;
        find all the users 200 in the topic participants table 540;
        send notifications to the user devices 600 using the user
```

TABLE 4-continued

```
        device table 520;
    else
        reject the reply message;
```

Although FIG. 11 shows the data structure 500 as including the topic replies table 560 and the topic queue table 550 for illustrative purposes only, the data structure 500 can include the topic replies table 560, the topic queue table 550, or a combination thereof, without limitation.

Figure 12:
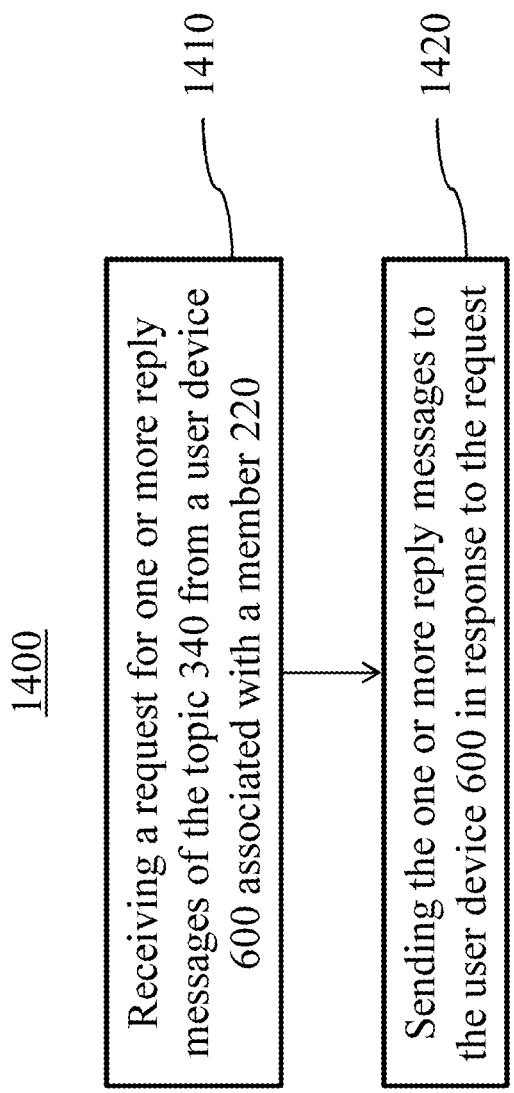
FIG. 12 is an exemplary flow chart illustrating an embodiment of a method for sending one or more reply messages using the chat system of FIG. 2.

Turning now to FIG. 12, an exemplary method 1400 for sending one or more reply messages is shown. The chat system 300 (shown in FIG. 2) can implement the method 1400. A request for one or more reply messages to the topic 340 is received, at 1410, from a user device 600 associated with a member 220. In some embodiments, the member 220 is not a participant 260 (shown in FIG. 2) of the topic 340.

The one or more reply messages are sent, at 1420, to the user device 600 in response to the request. Stated somewhat differently, the member 220 who has not joined the topic 340 can pull the reply messages of the topic 340.

Table 5 shows exemplary pseudo code of a server call 'getMessageForTopic' based on the data structure 500 (shown in FIG. 11) when the member 220 pulls reply messages of the topic 340. The server call 'getMessageForTopic' can be based on parameters including the group_id 512, the topic_id 518, and/or the user_id 514.

TABLE 5

```
getMessageForTopic(group_id 512, topic_id 518, user_id 514)
    return all the reply messages from the topic replies table 560
    to the user 200;
```

For example, when the member 220 is in the topic queue of the topic 340, the reply messages are not pushed to the member 220 in real time upon being published. Although not being permitted to publish a reply message, the member 220 can pull the reply messages sent from other participants 260 of the topic 340 for viewing.

The reply messages can thus be sent to the member 220 based on a request. Sending such reply message does not add significant real-time push service workload because the number of members 220 who make such a request typically may be small. The members 220 outside the topic subgroup 240 can advantageously "force pull" latest reply messages from the chat system 300 and do not miss out on the discussions for the topic 340.

Figure 13:
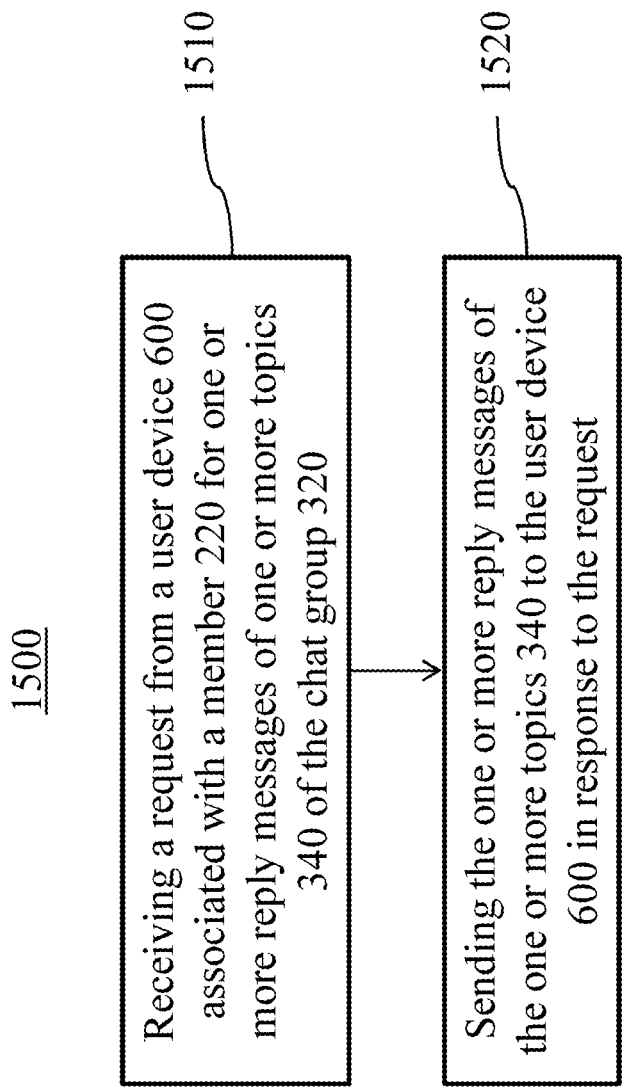
FIG. 13 is an exemplary flow chart illustrating an embodiment of a method for sending one or more reply messages of one or more topics using the chat system of FIG. 2.

Turning now to FIG. 13, a method 1500 is shown for sending one or more reply messages of one or more topics 340. The chat system 300 (shown in FIG. 2) can implement the method 1500. A request for one or more reply messages of one or more topics 340 of the chat group 320 is received, at 1510, from a user device 600 associated with a member 220. For example, the one or more topics 340 of the chat group 320 can include all topics 340 (or one or more selected topics 340) of the chat group 320. The member 220 is not necessarily a participant 260 of the one or more topics 340. For example, the member 220 is not a participant 260 (shown in FIG. 2) of any of the one or more topics 340.

The one or more reply messages of the one or more topics 340 are sent, at 1520, to the user device 600 in response to the request. Stated somewhat differently, the member 220 can pull the reply messages of the topics 340 of the chat group 320 to view ongoing discussion in the topics 340. Optionally, a predetermined number of latest reply messages of each topic 340 can be sent to the member 220 to avoid overwhelming the member 220.

Table 6 shows exemplary pseudo code of a server call 'getMessageForGroup' based on the data structure 500 (shown in FIG. 11) when the member 220 pulls reply messages of the topic 340. The server call 'getMessageForGroup' can be based on parameters including the group_id 512, and/or the user_id 514.

TABLE 6

```
getMessageForGroup(group_id 512,
    user_id 514)
    get all topics 340 from group topics table 530;
    get all reply messages from topic replies table 560 for the topics
    340;
    return the resultant topics 340 and reply messages;
```

Thus, the member 220 can advantageously be updated on ongoing discussions on any selected topic 340 in the chat group 320. For example, before determining which topic 340 to join, the member 220 can pull the reply messages and find a topic 340 of interest based on the reply messages. The reply messages can be sent to the member 220 based on a request. Since the number of members 220 who make such a request typically may be small, sending such reply message advantageously does not add significant real-time push service workload.

Therefore, even if the chat group 320 has an unlimited number of members 220, one or more topic subgroups 240 can be dynamically created based on the topics 340 about which the members 220 chat. Such topic subgroups 240 can be created to reduce the workload on the chat system 300 and ensure that the members 220 receive information that is actually wanted.

Subscription of the member 220 to the topic subgroup 240 can be managed dynamically and/or through a fixed membership with the topic subgroup 240. The dynamic subgrouping can be implemented automatically without necessarily using manual operation from a group owner. Thus, group management effort can be transparent to the members 220.

Additionally and/or alternatively, a group administrator of the chat group 320 and/or a topic owner of the topic 340 can monitor chat in real time and/or at a predetermined frequency, to evict a participant 260 if the participant 260 digresses repeatedly. Advantageously, focus of topic discussion, user engagement, and/or user responsibility can be promoted.

Thus, the chat system 300 can provide solutions to the technical problems of managing online group chat for the chat group 320 that has a very large size. Topic subgroups 240 having a limited size can be dynamically created and/or updated within the chat group 320. Pub-sub messaging service can be provided within each topic subgroup 240. Members 220 can view reply messages of a topic subgroup 240 without a requirement to be a participant 260 of the topic subgroup 240. These members 220 thus are not left out of the chat in the topic subgroup 240. The chat system 300 can thus reduce server workload, improve efficiency of information utilization, provide good online chat experience, and can further contribute to advancement of computer technology, communication technology, as well as online conferencing technology.

Figure 14:
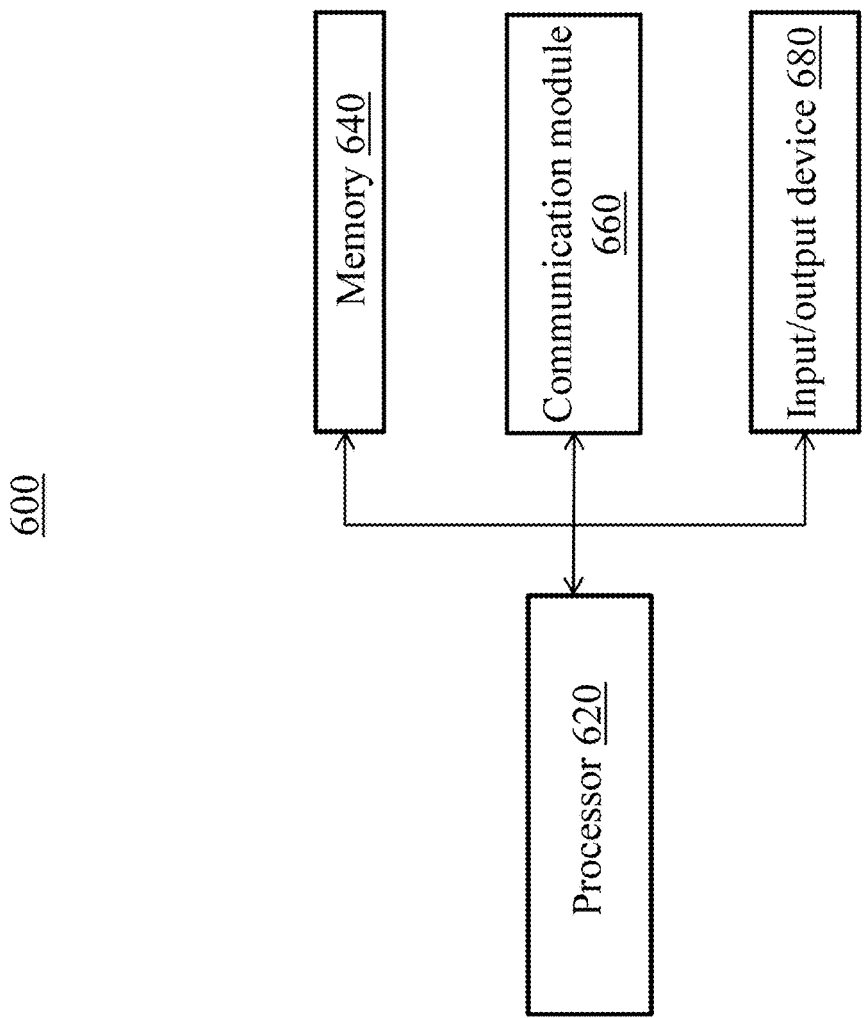
FIG. 14 is an exemplary diagram illustrating an embodiment of the user device of FIG. 1.

Turning to FIG. 14, an exemplary user device 600 is shown. The user device 600 can include a processor 620. The processor 620 can be provided in a similar manner as the processor 312 (shown in FIG. 4). The user device 600 can include a memory 640. The memory 640 can be provided in a similar manner as the memory 314 (shown in FIG. 4).

Coded instructions of a group chat application can be installed on the memory 640, to be executed by the processor 620. The group chat application can instruct the user device 600 to communicate with the chat system 300 (shown in FIG. 1) to collaboratively provide functions for group chat. The user device 600 can include a communication module 660. The communication module 660 can be provided in a similar manner as the communication module 316 (shown in FIG. 4).

The user device 600 can include an input/output device 680. The input/output device 680 can be provided in a similar manner as the input/output device 318 (shown in FIG. 4). For example, via the input/output device 680, the user device 600 can obtain information inputted by the user 200 for operating the group chat application, and/or output information of the group chat application to the user 200. The processor 620, the memory 640, the communication module 660, and/or the input/output device 680 can be configured to communicate, for example, using hardware connectors and buses and/or in a wireless manner.

Figure 15:
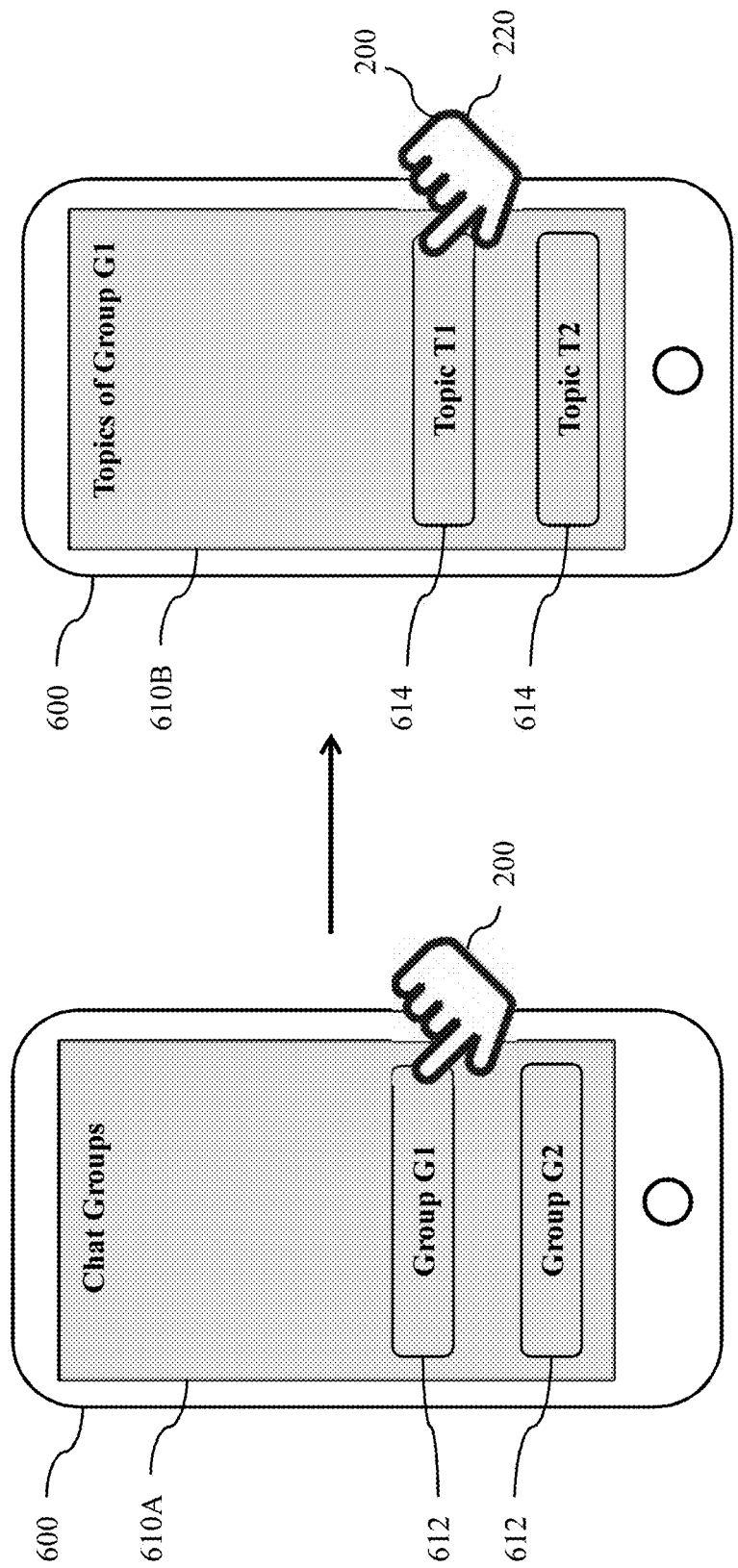
FIG. 15 is an exemplary diagram illustrating an embodiment of a user interface for online group chat presented on the user device of FIG. 14.

Turning now to FIG. 15, the user device 600 is shown as presenting two exemplary interfaces consecutively based on respective operations by the user 200. FIG. 15 illustrates a top-level interface 610A. The top-level interface 610A shows one or more chat group buttons 612 each corresponding to a chat group 320 (shown in FIG. 2).

When the user device 600 selects a chat group button 612 based on input by the user 200 and the user 200 is a member 220 (shown in FIG. 2) of a selected chat group 320 corresponding to the chat group button 612, a group interface 610B of the selected chat group 320 can be presented. The group interface 610B can include one or more topic buttons 614 each corresponding to a topic 340 (shown in FIG. 4) in the selected chat group 320. The user device 600 can select one of the topic buttons 614 based on input by the user 200, for the user 200 to view the topic 340 corresponding to the topic button 614.

Although FIG. 15 shows the interfaces 610A and 610B as including two chat group buttons 612 and two topic buttons 614, respectively, the interfaces 610A and 610B can each include more or fewer buttons than the buttons shown in FIG. 15. Although FIG. 15 shows tapping of buttons as control mechanisms for operating on the interfaces 610A and 610B, the interfaces 610A and 610B can be operated via additional and/or alternative control mechanisms. Exemplary control mechanisms can include keyboard, mouse, joystick, and/or the like. Additionally and/or alternatively, choices on the interfaces 610A and 610B can be presented in various forms not limited to buttons, exemplary forms including icons, scroll bars, tabs, texts, and/or the like. Although FIG. 15 shows the interfaces 610A and 610B as being used for selecting the chat group 320 and the topic 340, respectively, the interfaces 610A and 610B can include additional and/or alternative functions, without limitation.

Figure 16:
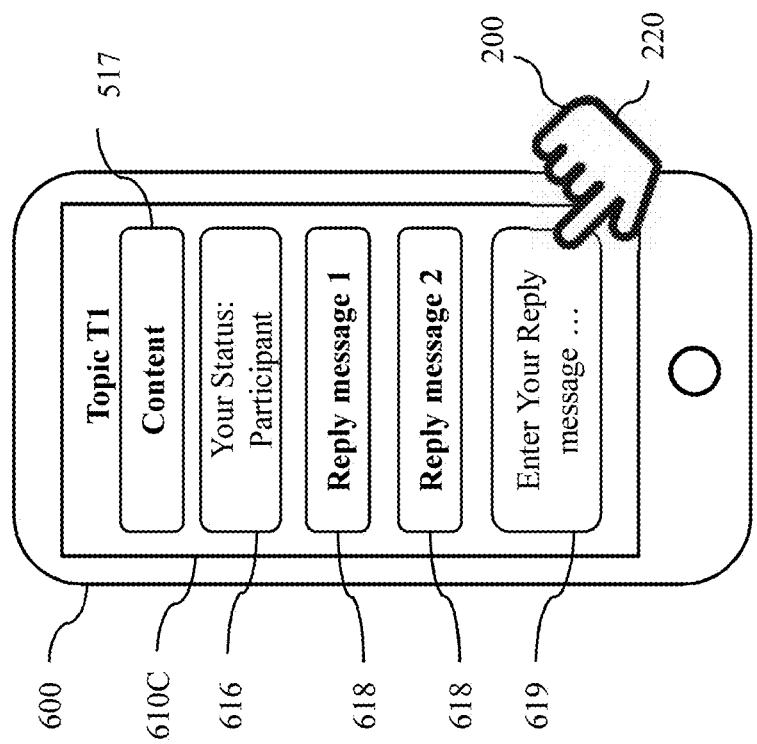
FIG. 16 is an exemplary diagram illustrating an alternative embodiment of the user interface of FIG. 15, wherein the user interface includes a topic interface of a topic presented to a participant of the topic.

Turning now to FIG. 16, the user device 600 is shown as presenting an exemplary topic interface 610C. The user device 600 can present the topic interface 610C, for example, after the user 200 selects the topic button 614 of the topic 340 (shown in FIG. 2). The topic interface 610C can show the content 517 of the topic 340. For example, the content 517 can include the title message associated with the topic 340. The topic interface 610C can show a status window 616 to indicate whether the user 200 has been permitted to join the topic 340 and/or added to a topic queue of the topic 340.

Additionally and/or alternatively, the topic interface 610C can include one or more reply messages 618. For example, the chat messages can be presented in a chronological order and/or a reverse chronological order based on a time of the reply message being sent to the chat system 300 (shown in FIG. 1).

Additionally and/or alternatively, the topic interface 610C can include a reply window 619. After the member 220 joins the topic 340, the user device 600 can obtain a reply message from the member 220 via the reply window 619. The topic interface 610C can notify the member 220 of permission to join the topic 340 by allowing the user 200 to input the reply message, even when the topic interface 610C does not present the status window 616.

Optionally, the topic interface 610C can include a spam report button (not shown) next to each presented reply message 618, for reporting to the chat system 300 that the reply message 618 is a spam and/or digress, so that the chat system 300 can, at least partially based on the reporting, evict a member 220 (and/or or user 200) publishing the reply message 618.

FIG. 16 shows the topic interface 610C for illustrative purposes only. The topic interface 610C can include more or less information than the information shown in FIG. 16. The topic interface 610C can provide more or fewer functions than the functions shown in FIG. 16.

Figure 17:
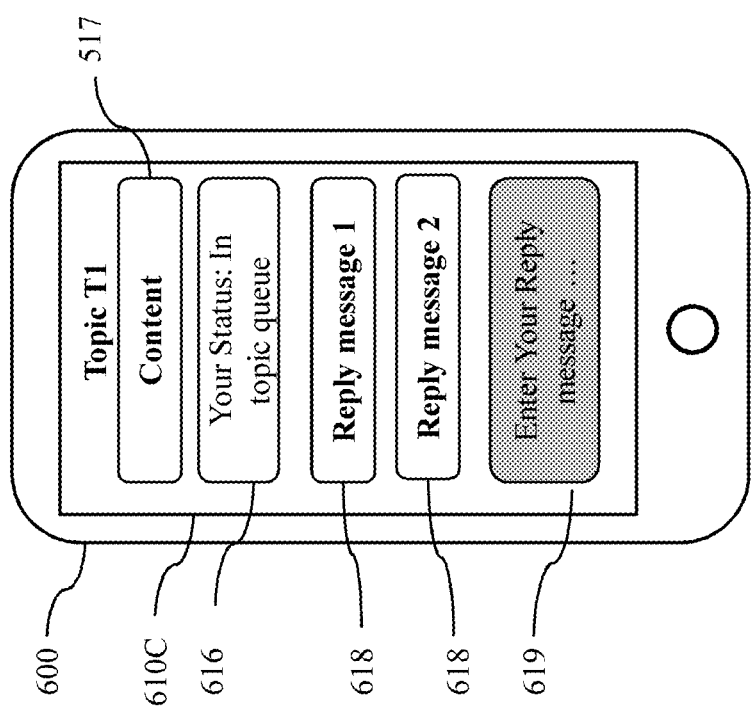
FIG. 17 is an exemplary diagram illustrating another alternative embodiment of the user interface of FIG. 15, wherein the user interface includes a topic interface of a topic presented to a user that is not a participant of the topic.

Turning to FIG. 17, the topic interface 610C is shown as presenting the reply window 619 that is disabled. When the member 220 is not permitted to join the topic subgroup 240, the user device 600 can notify the member 200 by disabling function of inputting reply messages. For example, the reply window 619 can be grayed out to indicate the reply window 619 cannot accept input. Additionally and/or alternatively, the user device 600 can generate a warning (for example, via a dialog window) to notify the member that the reply message is not accepted.

When the member 220 is added to the topic queue, the status window 616 can show that the member 220 is in the topic queue. Optionally, the status window 616 can indicate a position (not shown) of the member 220 in the topic queue, such as a number of other members 220 in the topic queue that are ahead of the member 220.

Figure 18:
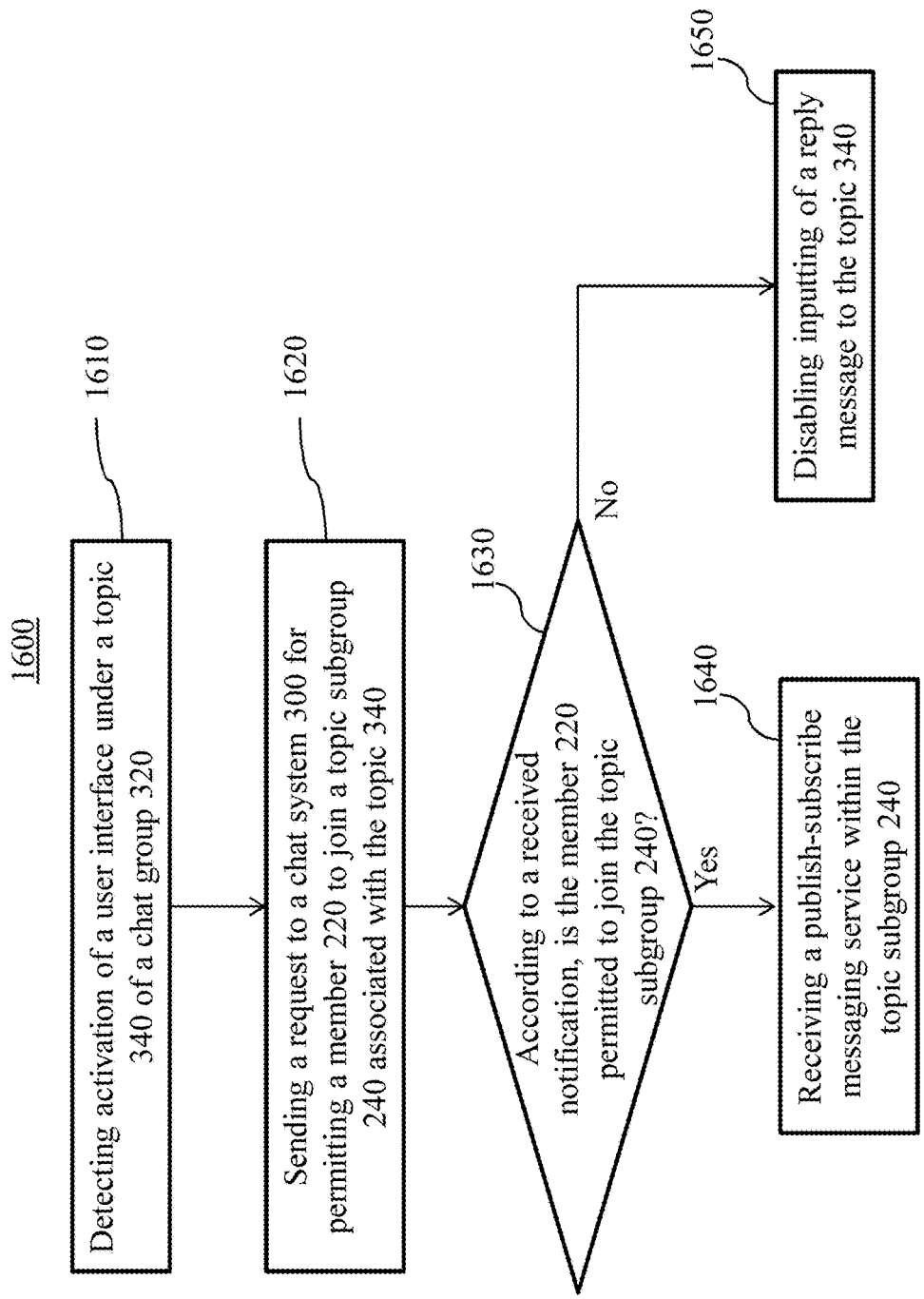
FIG. 18 is an exemplary flow chart illustrating an embodiment of a method for operating online group chat using the user device of FIG. 1.

Turning to FIG. 18, a method 1600 is shown for operating group online chat. The user device 600 (shown in FIG. 1) associated with a member 220 of the chat group 320 can implement the method 1600. Activation of a user interface of a topic 340 is detected, at 1610. The activation can indicate a request of the member 220 for joining the topic 340 and/or for viewing a presentation of the topic 340. The exemplary user interface associated with the topic 340 can include the topic interface 610C (shown in FIG. 16).

An exemplary operation can include an operation of the member 220 for selecting the topic 340 via the group interface 610B (shown in FIG. 15) on the user device 600.

A request is sent, at 1620, to the chat system 300 (shown in FIG. 1) for permitting the member 220 to join a topic subgroup 240 associated with the topic 340. For example, the request can be generated and/or sent upon the operation for joining the topic 340. Upon receiving the request, the chat system 300 can determine whether to permit the member 220 to join the topic subgroup 240.

A notification is received, at 1630, from the chat system 300 to indicate whether the member 220 is permitted to join the topic subgroup 240. Stated somewhat differently, the user device 600 can determine, according to the notification, whether the member 220 is listed in the topic subgroup 240 in response to the request. For example, the chat system 300 can notify the user device 600 that the member 220 is in the topic subgroup 240 and/or in the topic queue of the topic subgroup 240.

The pub-sub messaging service is received, at 1640, within the topic subgroup 240, based on the notification indicating that the member 220 is added to the topic subgroup 240. Optionally, inputting of a reply message to the topic 340 can be disabled, at 1650, based on the notification indicating that the member 220 is not added to the topic subgroup 240 and/or that the member 220 is added to the topic queue.

Figure 19:
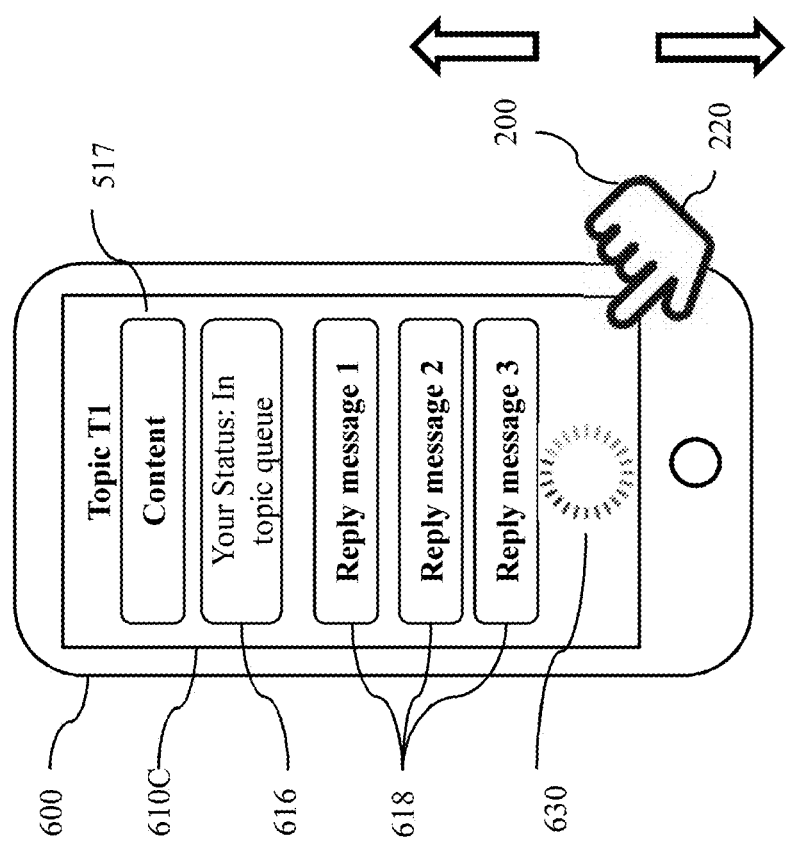
FIG. 19 is an exemplary diagram illustrating an alternative embodiment of the user interface of FIG. 17, wherein the user device pulls a reply message of the topic.

Turning to FIG. 19, the member 220 is shown as scrolling the topic interface 610C. For example, the reply messages 618 can be listed chronologically, with latest reply message (such as reply message 3) at a bottom of the topic interface 610C. Scrolling in an upward direction can thus pull one or more reply messages that are more recent than the reply message 3. A loading sign 630 is shown to when loading of the reply message is in progress. Similarly, the member 220 can pull one or more messages that are older than reply message 1 by scrolling in a downward direction.

Additionally and/or alternatively, the reply messages 618 can be listed reverse chronologically, for example, with the latest reply message at a top of the topic interface 610C. Direction of scrolling the topic interface 610C can be adjusted based on reply messages needed by the member 220.

Figure 20:
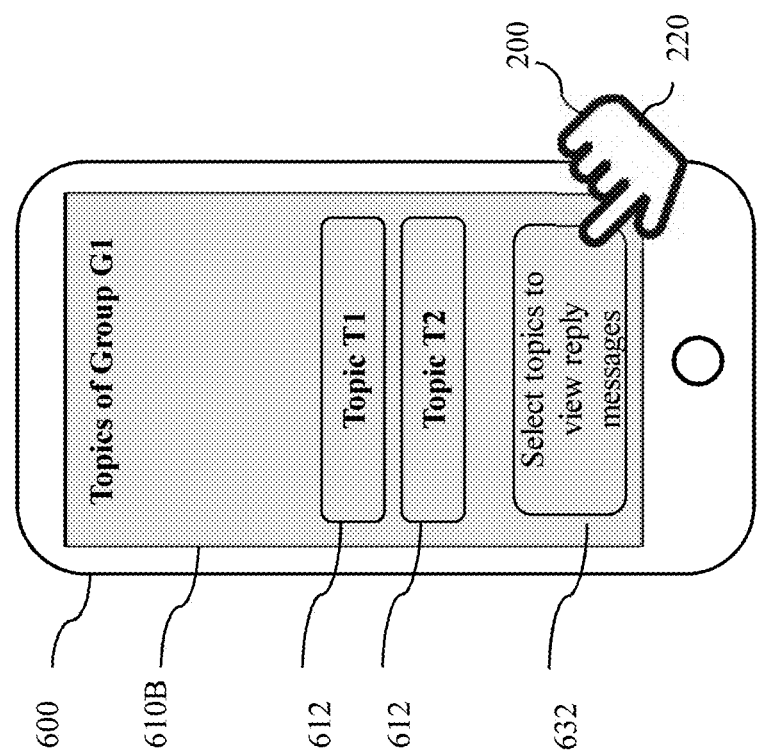
FIG. 20 is an exemplary diagram illustrating another alternative embodiment of the user interface of FIG. 15, wherein the user interface includes a topic select-view button.

Turning to FIG. 20, the user device 600 is shown as presenting a topic select-view button 632 in the group interface 610B. When the member 220 selects the topic select-view button 632, the user device 600 can permit the member 220 to select the topics 340 (shown in FIG. 2) via the topic buttons 612. The user device 600 can thus send the request to the chat system 300 to pull reply messages of the selected topics 340.

Figure 21:
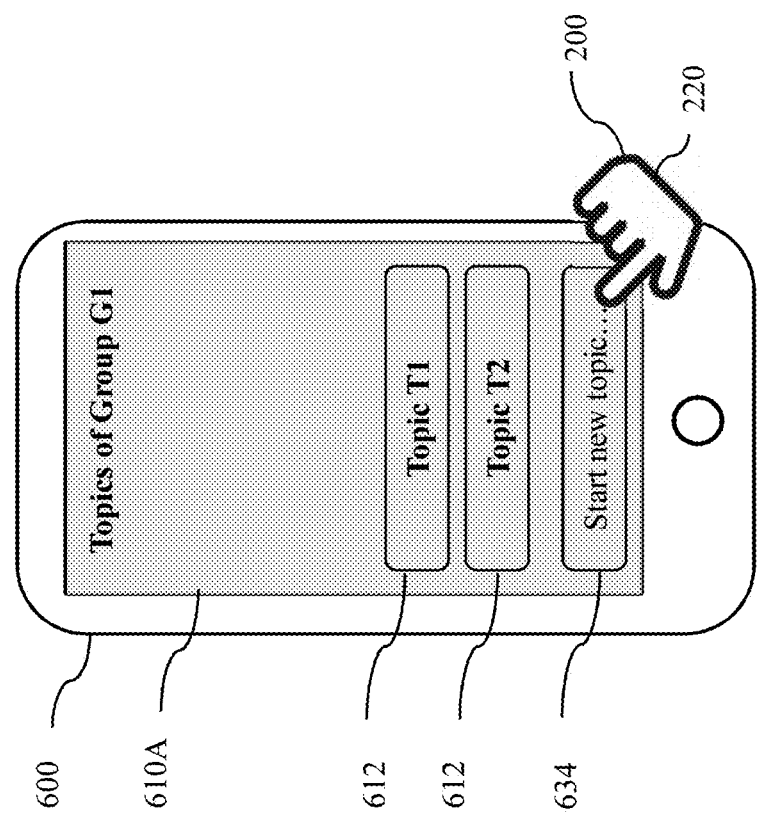
FIG. 21 is an exemplary diagram illustrating still another alternative embodiment of the user interface of FIG. 15, wherein the user interface includes a topic creation window.

Turning to FIG. 21, the user device 600 is shown as presenting a topic creation window 634 in the group interface 610B. The member 220 can input content into the topic creation window 634. The title message can be used for creating a new topic 340 (shown in FIG. 2).

Figure 22:
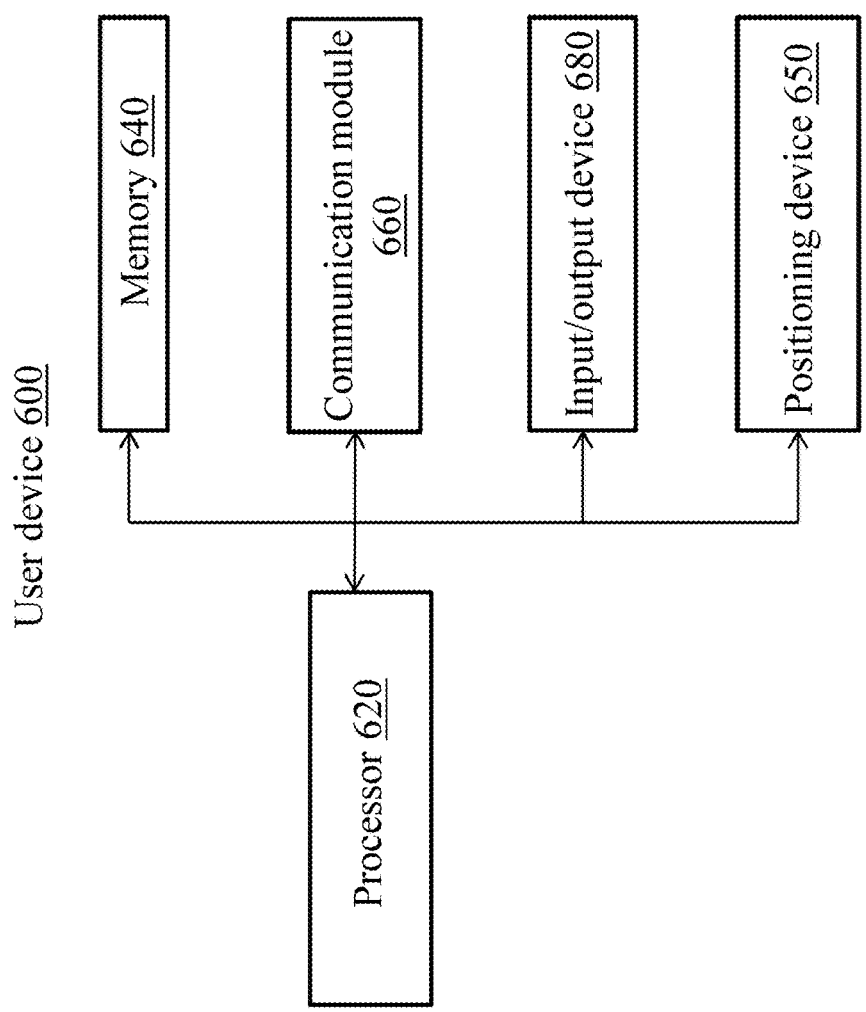
FIG. 22 is an exemplary diagram illustrating an alternative embodiment of the user device of FIG. 14, wherein the user device includes a positioning device.

Turning to FIG. 22, the user device 600 can include a positioning device 650 in communication with the processor 620. The positioning device 650 can include any device operating to obtain a location of the user device 600. The positioning device 650 can be global positioning system (GPS)-based, wireless local area network (WLAN)-based (or WiFi-based), and/or cell transmitter-based. An exemplary positioning device 650 can include a Global positioning system (GPS) module, a differential GPS module, or a combination thereof. In certain embodiments, the positioning device 650 can obtain the location of the user device 600 in real time.

The user device 600 can send the location to the chat system 300 (shown in FIG. 2). In some examples, the chat system 300 can create one or more topics 340 (shown in FIG. 2) at least partially based on geographic regions. Thus, based on the location, the chat system 300 can select a topic 340 for the member 220 (shown in FIG. 2) associated with the user device 600. For example, the member 220 can select a topic 340 for restaurant reviews. The chat group 320 may have a plurality of topics 340 for restaurant reviews, each based on a respective geographic region. The chat system 300 can select the topic 340 based on the geographic region that includes the location of the user device 600, and send the selected topic 340 to the user device 600. The user device 600 can present the selected topic 340 to the member 220 to suggest and/or recommend the member 220 joining the selected topic 340.

Additionally and/or alternatively, the user device 600 and/or the chat system 300 can suggest one or more topics 340 to the member 220 via analyzing profile and/or preference of the member 220 stored on the chat system 300 and/or on the user device 600. For example, based on a course that the member 220 enrolls in at an educational institute, the chat system 300 can select the topic 340 of discussing the course for suggesting to the member 220. In another example, the user device 600 can determine that the member 220 browses websites for a certain consumer product often. The chat system 300 can select the topic 340 of discussing the consumer product for suggesting to the member 220.

Figure 23:
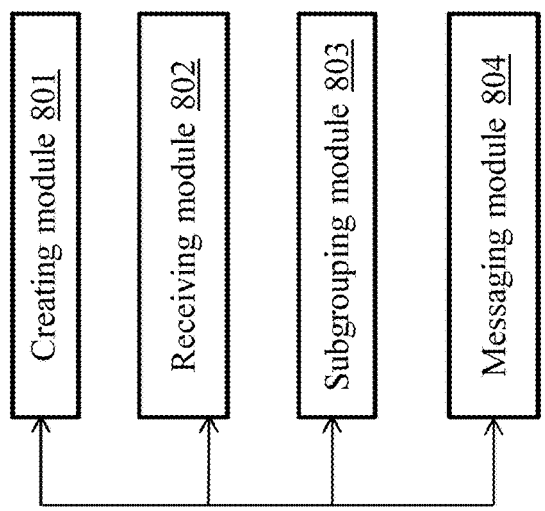
FIG. 23 is an exemplary diagram illustrating an embodiment of a processing system including a creating module, a receiving module, a subgrouping module, and a messaging module for managing online group chat.

Turning now to FIG. 23, an exemplary processing system 800 is shown as including one or more modules to perform any of the disclosed methods that can be implemented by the chat system 300 (shown in FIG. 1). The processing system 800 is shown as including a creating module 801, a receiving module 802, a subgrouping module 803, and a messaging module 804. In some embodiments, the creating module 801 can be configured to create a topic 340 (shown in FIG. 2) in a chat group 320 (shown in FIG. 2). The receiving module 802 can be configured to receive a request from a user device 600 (shown in FIG. 1) associated with a member 220 (shown in FIG. 2) of the chat group 320 to join the topic 340. The request can be triggered by an operation of the member 220 on the user device 600 to enter a user interface associated with the topic 340. The subgrouping module 803 can be configured to permit, in real time, the member 320 to join a topic subgroup 240 (shown in FIG. 2) associated with the topic, upon determining that a membership of the topic subgroup 240 is less than a maximum participant number that is based on a messaging service capacity of the processing system 800. The messaging module 804 can be configured to offer a pub-sub messaging service for the topic subgroup 240.

In some embodiments, the receiving module 802 can be configured to receive a request for one or more reply messages of the topic 340 from a member 220 of the chat group 320 that is not in the topic subgroup 240 associated with the topic 340, and send the one or more reply messages to the member 220 upon receiving the request. In some embodiments, the receiving module can be configured to receive a request for one or more reply messages of one or more topics 340 of the chat group 320 from a member 220 of the chat group 320, and send the one or more reply messages of the one or more topics 340 to the member 220 upon receiving the request.

In some embodiments, the subgrouping module 803 can be configured to permit the member to join a topic queue of the topic subgroup 240 upon determining that the membership of the topic subgroup 240 is greater than or equal to the maximum participant number. In some embodiments, the subgrouping module 803 can be configured to detect that a participant 260 (shown in FIG. 2) of the topic 340 leaves the topic subgroup 240 according to an operation of the participant 260 on a user device 600 to leave the user interface associated with the topic 340, a disconnection between the processing system 800 and the user device 600 of the participant 260, or a combination thereof, select a member 220 from the topic queue of the topic subgroup 240, and move the selected member 220 from the topic queue to the topic subgroup 240. In some embodiments, the subgrouping module 803 can be configured to associate the member 220 in the topic queue with a join time 519 (shown in FIG. 8), and select the member 220 that has an earliest join time 519 in the topic queue.

In some embodiments, the messaging module 804 can be configured to receive a reply message to the topic 340 from a member 220 of the chat group 320, determine whether the member 220 is in the topic subgroup 240 associated with the topic 340, and push the reply message to other participants 260 of the topic subgroup 240 after determining that the member 220 is in the topic subgroup 240 associated with the topic 340.

Figure 24:
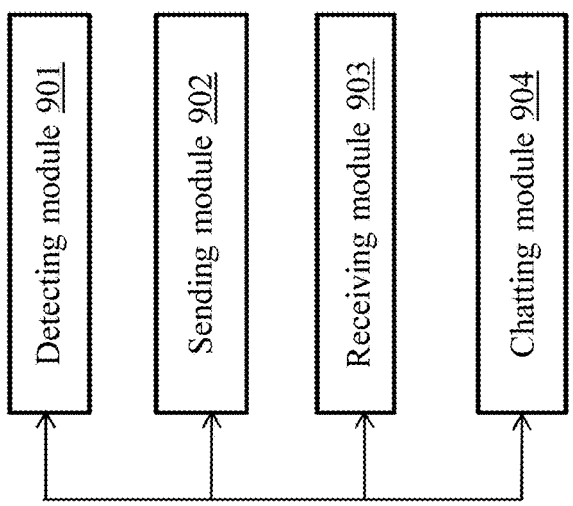
FIG. 24 is an exemplary diagram illustrating an embodiment of a processing system including a creating module, a receiving module, a subgrouping module, and a messaging module for operating online group chat.

Turning now to FIG. 24, an exemplary processing system 900 is shown as including one or more modules to perform any of the disclosed methods that can be implemented by the user device 600 (shown in FIG. 1). The processing system 900 is shown as including a detecting module 901, a sending module 902, a receiving module 903, and a chatting module 904. In some embodiments, the detecting module 901 can be configured to detect an operation of a member 220 (shown in FIG. 2) of a chat group 320 (shown in FIG. 2) for entering a user interface associated with a topic 340 (shown in FIG. 2) in the chat group 320. The sending module 902 can be configured to send a request to a chat system 300 (shown in FIG. 1) for permitting the member 220 to join a topic subgroup 240 (shown in FIG. 2) associated with the topic 340. A membership of the topic subgroup 240 can be limited to a maximum participant number based on a messaging service capacity of the chat system 300. The receiving module 903 can be configured to receive a notification from the chat system 300 to indicate whether the member 220 is permitted to join the topic subgroup 240. The chatting module 904 can be configured to receive a pub-sub messaging service within the topic subgroup 240 provided by the chat system 300, based on the notification indicating that the member 220 is permitted to join the topic subgroup 240.

In some embodiments, the receiving module 903 can be configured to receive the notification that the member 220 is permitted to join the topic subgroup 240 upon determination that the membership of the topic subgroup 240 is less than the maximum participant number, and receive the notification that the member 220 is added to, and/or listed in, a topic queue of the topic subgroup 240 upon determination that the membership of the topic subgroup 240 is greater than or equal to the maximum participant number. In some embodiments, the receiving module 903 can be configured to disable inputting of a reply message for the topic 340 after receiving the notification that the member 220 is added to a topic queue of the topic subgroup 340.

In some embodiments, the member 220 is not in the topic subgroup 240 of the topic 340. The receiving module 903 can be configured to pull one or more reply messages of the topic 340 from the chat system 300. In some embodiments, the member 220 is not in topic subgroups 240 of one or more topics 340. The receiving module 903 can be configured to pull one or more reply messages of the one or more topics 340.

In some embodiments, the sending module 902 can be configured to send to the chat system 300 a location of the member 220 of the chat group 320, for the chat system 300 to select a topic 340 in the chat group 320 according to the location. The receiving module 903 can be configured to present the selected topic 340 to suggest the member 220 joining a topic subgroup 240 associated with the selected topic 340.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for managing online group chat using a server computer, comprising:
   creating a topic in a chat group;
   receiving a request to join the topic from a user device associated with a member of the chat group in response to activation of a user interface of the topic on the user device;
   permitting, in response to the request and in real time, the member to join a topic subgroup of participants associated with the topic upon determining that a membership of the topic subgroup is less than a maximum participant number of the topic subgroup;
   permitting the member to join a topic queue of the topic subgroup upon determining that the membership of the topic subgroup is equal to the maximum participant number, the member being associated with a join time that includes a time stamp of the request;
   offering a publish-subscribe (pub-sub) messaging service for current participants in the topic subgroup;
   upon determination that the user interface of the topic is inactive on the user device of a participant in the topic subgroup:
      terminating participation of the participant in the topic subgroup;
      sending reply messages of the topic to the user device only upon pulling of the reply messages by the user device;
      selecting a member listed in the topic queue of the topic subgroup, the selected member being associated with an earliest join time, a highest subscription payment level, or a combination thereof; and
      permitting the selected member to move from the topic queue to the topic subgroup;
   permitting a member of the chat group who is not in the topic subgroup to only receive the reply messages of the topic via pulling the reply messages of the topic, wherein the determination that the user interface of the topic is inactive on the user device of the participant in the topic subgroup is based on a determination that the user device switches to a chat-group-level user interface or a user interface of a different topic subgroup, that a network connection between the user device and the server computer is terminated, or a combination thereof.

2. The method of claim 1, further comprising:
   receiving a request for one or more reply messages of the topic from a user device associated with a member of the chat group who is not in the topic subgroup; and
   sending the one or more reply messages to the user device associated with the member upon said receiving.

3. The method of claim 1, further comprising:
   receiving a request for one or more reply messages of one or more topics of the chat group from a user device associated with a member of the chat group; and
   sending the one or more reply messages of the one or more topics to the user device associated with the member upon said receiving.

4. The method of claim 1, wherein said selecting comprises selecting the member associated with the earliest join time in the topic queue.

5. The method of claim 1, wherein said offering the pub-sub messaging service comprises:
   receiving a reply message to the topic from a user device associated with a member of the chat group;
   determining whether the member is in the topic subgroup; and
   pushing the reply message to user devices respectively associated with other participants of the topic subgroup upon determining that the member is in the topic subgroup.

6. A system for managing online group chat, comprising:
   a server computer that operates to:
   dynamically create a topic in a chat group based on a title message sent by a first member of the chat group;
   dynamically create a topic subgroup of participants to associate with the topic;
   receive a request to join the topic subgroup from a user device associated with a member of the chat group in response to activation of a user interface associated with the topic on the user device;
   permit, in real time and in response to the request, the member to join the topic subgroup upon determining that a membership of the topic subgroup is less than a maximum participant number of the topic subgroup;
   permit the member to join a topic queue of the topic subgroup upon determining that the membership of the topic subgroup is equal to the maximum participant number, the member being associated with a join time that includes a time stamp of the request;
   offer a publish-subscribe (pub-sub) messaging service for the topic subgroup;
   upon determination that the user interface of the topic is inactive on the user device of a participant in the topic subgroup:
      terminate participation of the participant in the topic subgroup;
      send reply messages of the topic to the user device only upon pulling of the reply messages by the user device;
      select a member listed in the topic queue of the topic subgroup, the selected member being associated with an earliest join time, a highest subscription payment level, or a combination thereof; and
      permit the selected member to move from the topic queue to the topic subgroup; and
   permit a member of the chat group who is not in the topic subgroup to only receive the reply messages of the topic via pulling the reply messages of the topic;
   wherein the determination that the user interface of the topic is inactive on the user device of the participant in the topic subgroup is based on a determination that the user device switches to a chat-group-level user interface or a user interface of a different topic subgroup, that a network connection between the user device and the server computer is terminated, or a combination thereof.

7. The system of claim 6, wherein said server computer operates to:
   receive a request for one or more reply messages of the topic from a user device associated with a member of the chat group who is not in the topic subgroup; and
   send the one or more reply messages to the user device associated with the member upon said receiving.

8. The system of claim 6, wherein said server computer operates to:
   receive a request for one or more reply messages of one or more topics of the chat group from a user device associated with a member of the chat group; and
   send the one or more reply messages of the one or more topics to the user device associated with the member upon said receiving.

9. The system of claim 6, wherein the selected member is associated with an earliest join time in the topic queue.

10. The system of claim 6, wherein said server computer operates to:
    receive a reply message to the topic from a user device associated with a member of the chat group;
    determine whether the member is in the topic subgroup; and
    push the reply message to user devices respectively associated with other participants of the topic subgroup upon determining that the member is in the topic subgroup.

11. A method for operating online group chat via a user device associated with a member of a chat group, comprising:
    detecting activation of a user interface of a topic in the chat group;
    sending a request to a chat system for permitting the member to join a topic subgroup of participants associated with the topic, a membership of the topic subgroup being limited to a maximum participant number of the topic subgroup;
    receiving a notification from the chat system to indicate whether the member is permitted to join the topic subgroup, the notification indicating:
       that the member is permitted to join the topic subgroup upon a determination by the chat system that the membership of the topic subgroup is less than the maximum participant number; or
       that the member is permitted to join a topic queue of the topic subgroup upon a determination by the chat system that the membership of the topic subgroup is equal to the maximum participant number, the member being associated with a join time that includes a time stamp of the request;
    receiving a publish-subscribe (pub-sub) messaging service within the topic subgroup provided by the chat system upon receiving the notification indicating that the member is permitted to join the topic subgroup;
    upon the user interface of the topic being inactive on the user device of a participant in the topic subgroup, disabling inputting of a new reply message for the topic, and receiving reply messages of the topic from the chat system only via pulling of the reply messages; and
    upon receiving a notification from the chat system to indicate the member is in the topic queue of the topic subgroup:
       receiving reply messages of the topic only via pulling the reply messages of the topic; and
       enabling inputting of a new reply message for the topic upon the chat system terminating participation of a selected participant in the topic subgroup and upon the chat system moving the member from the topic queue to the topic subgroup, the member being selected by the chat system by being associated with an earliest join time, a highest subscription payment level, or a combination thereof; wherein that the user interface of the topic is inactive on the user device of the participant in the topic subgroup is based on a determination that the user device switches to a chat-group-level user interface or a user interface of a different topic subgroup, that a network connection between the user device and the chat system is terminated, or a combination thereof.

12. The method of claim 11, further comprising disabling inputting of a reply message for the topic upon receiving the notification that the member is permitted to join the topic queue of the topic subgroup.

13. The method of claim 11, further comprising pulling one or more reply messages of the topic from the chat system for a member who is not a participant of the topic subgroup.

14. The method of claim 11, further comprising pulling one or more reply messages of one or more topics of the chat group from the chat system for a member who is not a participant of the one or more topics.

15. The method of claim 11, further comprising:
sending to the chat system a location of the user device for the chat system to select a topic in the chat group according to the location; and
presenting the selected topic as a recommended topic for the member to join.

* * * * *